(12) United States Patent
Bannihatti Kumar et al.

(10) Patent No.: US 12,475,489 B1
(45) Date of Patent: *Nov. 18, 2025

(54) SYSTEM FOR CONFIGURING NETWORK BASED SERVICES BASED ON CUSTOMER PROFILE

(71) Applicant: Amazon Technologies, Inc., Seattle, WA (US)

(72) Inventors: Vinayshekhar Bannihatti Kumar, Santa Clara, CA (US); Rashmi Gangadharaiah, San Jose, CA (US); Sonia Ramnani, Newark, CA (US); Grace Kitzmiller, Oakton, VA (US); Logan Douglas, San Antonio, TX (US)

(73) Assignee: Amazon Technologies, Inc., Seattle, WA (US)

( * ) Notice: Subject to any disclaimer, the term of this patent is extended or adjusted under 35 U.S.C. 154(b) by 313 days.

This patent is subject to a terminal disclaimer.

(21) Appl. No.: 17/936,748

(22) Filed: Sep. 29, 2022

(51) Int. Cl.
*G06Q 30/02* (2023.01)
*G06F 9/50* (2006.01)
*H04L 67/50* (2022.01)

(52) U.S. Cl.
CPC ....... *G06Q 30/0281* (2013.01); *G06F 9/5005* (2013.01); *H04L 67/50* (2022.05); *G06F 2209/501* (2013.01); *G06F 2209/5015* (2013.01)

(58) Field of Classification Search
CPC ............. G06F 9/5005; G06F 2209/501; G06F 2209/5015; G06Q 30/0281; H04L 67/50
See application file for complete search history.

(56) References Cited

U.S. PATENT DOCUMENTS

| | | | | |
|---|---|---|---|---|
| 10,990,759 | B1* | 4/2021 | Sosonkin | H04L 9/3239 |
| 11,431,563 | B1* | 8/2022 | Holzman | H04L 41/22 |
| 11,818,004 | B1* | 11/2023 | Bannihatti Kumar | H04L 41/0866 |
| 2003/0126196 | A1* | 7/2003 | Lagimonier | H04L 69/329 709/226 |
| 2017/0288967 | A1* | 10/2017 | Naqvi | H04L 41/0843 |
| 2019/0028364 | A1* | 1/2019 | Keller | G06F 9/5077 |
| 2019/0037077 | A1* | 1/2019 | Konig | H04M 3/5183 |
| 2021/0019194 | A1* | 1/2021 | Bahl | H04L 67/1031 |
| 2021/0349764 | A1* | 11/2021 | Tormasov | G06F 9/5066 |
| 2022/0360504 | A1* | 11/2022 | Kairali | H04M 15/44 |

* cited by examiner

*Primary Examiner* — G. C. Neurauter, Jr.
(74) *Attorney, Agent, or Firm* — Knobbe Martens Olson & Bear LLP

(57) ABSTRACT

The present disclosure relates to systems and methods for providing a network-based service infrastructure configuration for a plurality of network-based services. A configuration service may identify one or more network-based services based on identifying the customer's profile and grouping the customer with other customers having a similar profile. After grouping the customer input, the configuration service may automatically provide network infrastructure configuration templates. The configuration service may identify and verify attributes required by each identified service and its associated property values. The configuration service may configure the infrastructure configuration by selecting a template from the plurality of templates stored in a datastore.

22 Claims, 15 Drawing Sheets

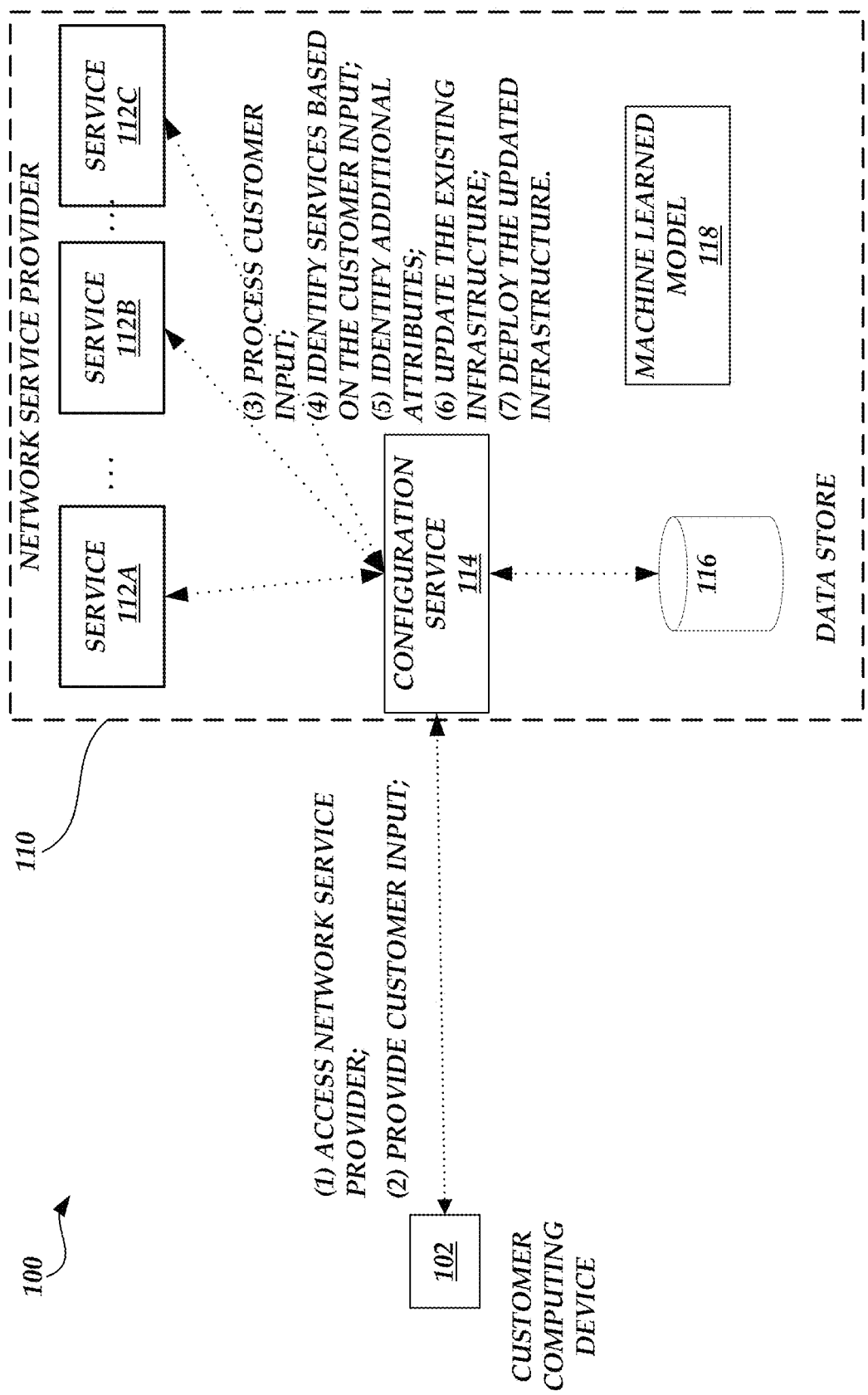

SYSTEM FOR CONFIGURING NETWORK BASED SERVICES BASED ON CUSTOMER PROFILE

BACKGROUND

Generally described, external computing devices and communication networks can be utilized to exchange data and/or information. In a common application, an external computing device can request content from another external computing device via the communication network. For example, a user having access to an external computing device can utilize a software application to request content or access network-hosed applications/functionality from an external computing device via the network (e.g., the Internet). Additionally, the external computing device can collect or generate information and provide the collected information to a network-based customer computing device for further processing or analysis. The external computing device can be referred to as a customer computing device.

In some embodiments, a network service provider can provide various types of network-based services that are configurable to execute tasks based on inputs from the customer computing device. In some scenarios, it may be possible for a customer or user to configure the network-based services by utilizing the customer computing device. In certain scenarios, the network-based services can be configured by implementing configuration processes, such as a network-based service infrastructure configuration process. In some embodiments, each individual network-based service can independently implement a configuration process that correspond to the customer's use of the service. In these embodiments, the configuration process can include receiving network configuration attributes and their property values from the customer computing device.

In some applications, the network services can be configured by an infrastructure configuration process utilizing an instruction embedded in each network-based service. Illustratively, each network-based service includes an embedded instruction for performing the infrastructure configuration and subsequently performed related configuration process that allows the customer to use the service. For example, in some embodiments, communications and associated interactions between a network service provider and a customer computing device can confirm a template, such as an infrastructure configuration template corresponding to network-based services. In accordance with this approach, a network-based service infrastructure configuration by the network service provider can be embodied as a smart architecture system for proving a network-based service infrastructure configuration.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

FIG. 3C is an illustrative interaction of updating existing infrastructure configuration based on analyzing a customer input;

DETAILED DESCRIPTION

Figure 1:
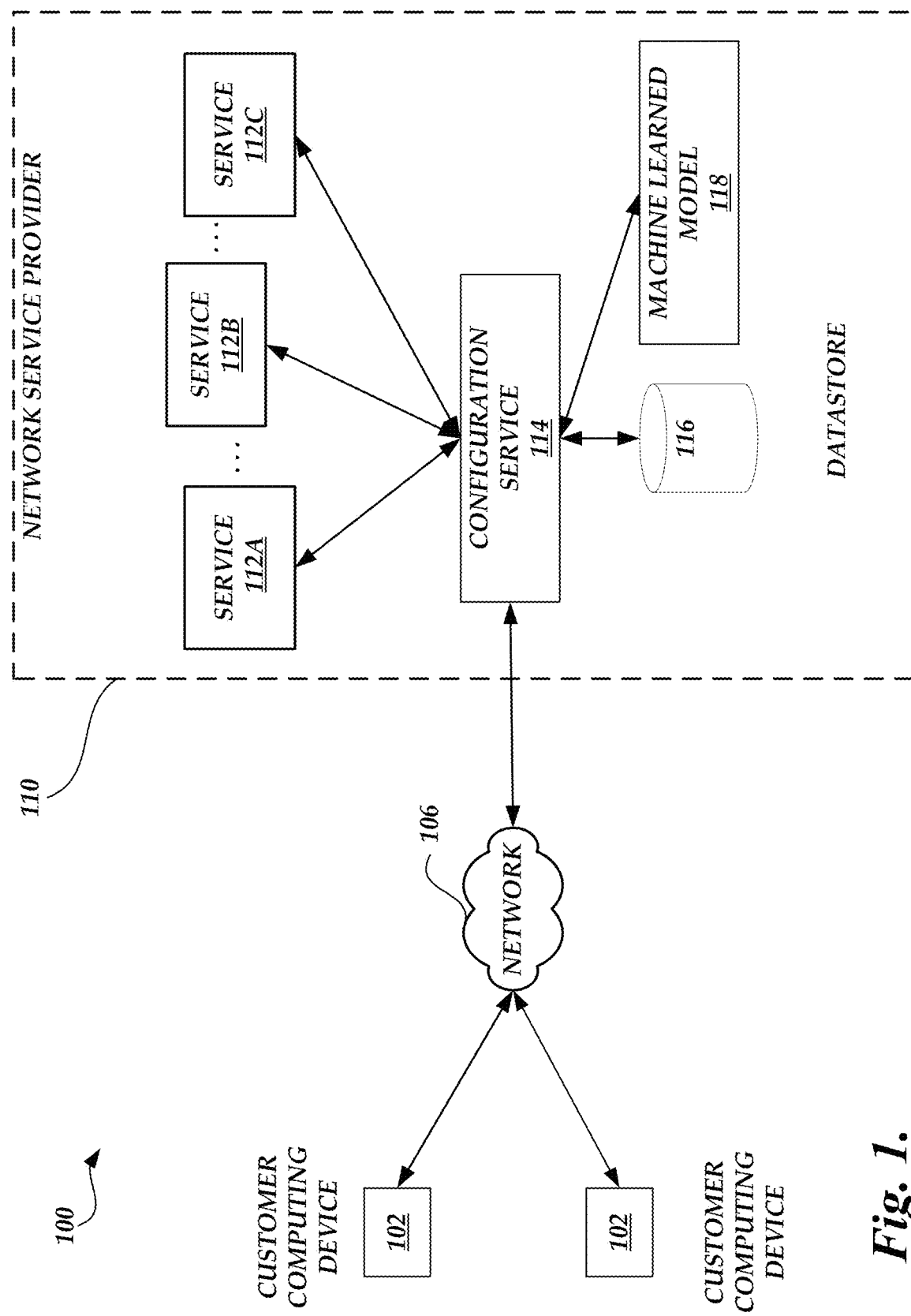
FIG. 1 depicts a block diagram of a network system that includes one or more customer computing devices, a network service provider, a configuration service, a machined learned model, and a datastore according to one embodiment.

Aspects of the present disclosure relate to systems and methods for providing a network-based service (e.g., network service) for configuration for a plurality of other network-based services. Illustratively, one or more aspects of the present application correspond to the utilization of a configuration service to configure network infrastructure based on customer input. Such customer input may be implemented in a manner that follows a variable input model, such as natural language inputs or keyword processing. Each network-based service may require an infrastructure configuration process corresponding to the service's association with other services, and each service includes an embedded instruction for the configuration process.

In accordance with one or more aspects of the present application, a configuration service can utilize an infrastructure configuration instruction corresponding to each network-based service. Each network-based service may include the infrastructure configuration instruction, such that the instruction is embedded as a text file. The instruction may provide the required attributes to configure the infrastructure. The configuration service may identify the required attributes. Based on the identification, the configuration service can then facilitate the infrastructure configuration process for automated configuration.

In one aspect, the configuration service may identify one or more network-based services and actions required for the services based on analyzing customer input. Illustratively, the configuration service may receive customer input and analyze the customer input to identify the network-based services and its required action corresponding to each service, such as "add," "create," "delete," etc. For example, a customer may provide input, such as "add EC2." Then, the configuration service may identify the "EC2" as a type of hosted network service or hosted network application and the "add" as an action. In some embodiments, the configuration service utilizes a machine learned model to analyze the customer input, where the machine learned model may process a human natural language. In these embodiments, the configuration service may provide functionality to communicate with the customer (e.g., an artificial intelligent based communication component), such as a chatbot. Illustratively, a customer may provide input in a context of a human language by communicating with the chatbot, and the configuration service, by utilizing the machine learned model, can process the natural language to identify network-based services and required action.

In another aspect, the configuration service may perform the infrastructure configuration process corresponding to the network-based service identified by analyzing the customer input. The infrastructure configuration can be performed automatically without requiring the customer to perform the configuration manually. The configuration service, as disclosed herein, can be implemented in configuration service provider resources or implemented as a stand-alone component.

Generally, traditional network infrastructure configuration for using network-based services presents significant technical challenges for customers and network-based service providers. More specifically, the customer must manually identify network-based services and perform an infrastructure configuration corresponding to the identified network-based services to use the services. In one aspect, each of the network-based services may implement a network infrastructure configuration process but must be individually configured to use the services. In one aspect, after identifying a network-based service, the customer may have to manually configure the infrastructure configuration corresponding to the identified service. To manually configure the infrastructure configuration, for example, the customer may have to access metadata to identify and download the attributes required in the configuration. In this example, the data format of the downloaded attributes has to be converted into a data format required by the configuration process associated with the service.

In one aspect, the network service provider can also have a challenge in optimizing its network resource usage. Illustratively, customers may utilize the network resources of the network service provider to access more than one service. For example, the customers may utilize network resources to identify a service and may perform the infrastructure configuration. However, the customers, in determining that the identified service generates an error during the configuration, may not know how to solve the error. Then, the customer may search and identify another service and perform the infrastructure configuration. In addition, the customer has to configure the infrastructure corresponding to a service at a time, hopping between multiple service consoles by utilizing the network resources. Furthermore, if the customer does not successfully identify or manually configure the infrastructure configuration, the network service provider cannot provide a proper service to the customer.

To address at least a portion of the above-described deficiencies, one or more aspects of the present disclosure correspond to systems and methods for providing access to network-based services by identifying network-based services and configuring infrastructure corresponding to the identified services by analyzing the customer input. According to one or more embodiments as disclosed herein, a configuration service may analyze the customer input to identify network-based services and the required action associated with each service. The configuration service may automatically configure the infrastructure corresponding to the network-based services.

Illustratively, the configuration service may analyze the customer input and provide one or more network-based services that can be used according to the customer input. In this illustration, the configuration service accesses the network instances of the network service providers to search and identify the services based on the analyzed results of the customer input. In some embodiments, the configuration service may utilize a machine learned model to analyze the customer input. In these embodiments, the machine learned model may process human natural languages to identify network-bases services from the customer input. For example, the customer may speak and/or type, using a chatbot, an input composed of human natural language, and the machine learned model to process the natural language and identify the customer's needs, such as the type of services and action required for each service. In this example, after identifying the customer's needs, the configuration service may provide an interface to visually display the identified services and its required action on the customer computing device.

In some embodiments, the configuration service recommends services based on analyzing the customer's profile and network usage pattern. In these embodiments, the configuration service may analyze the customer's profile and usage pattern and recommend another service based on the analyzed results. For example, the configuration service may analyze a customer's budget and a network traffic for using the service. In this example, in determining that the customer needs to reduce cost and the network traffic associated with the service usage is low, the configuration service may recommend another service that uses fewer network resources with a lower cost.

In some embodiments, the configuration service can provide cost associated infrastructure configuration. In these embodiments, the configuration service may estimate network resource usage based on analyzing the customer input to calculate an estimated cost. For example, the configuration service may estimate the network resources usage based on the customer's profile, usage pattern, and type of selected network-based services to determine the required network resources and estimate the cost. In one embodiment, the configuration service may utilize a machine learned model to estimate network resource usage.

Illustratively, the configuration service may automatically perform an infrastructure configuration corresponding to the identified services. In some embodiments, the configuration service identifies one or more attributes required for the configuration. In these embodiments, the configuration service identifies an infrastructure configuration instruction that provides attributes for performing the configuration. The instruction can be embedded in the network-based services in the form of text files. The configuration service may use the instruction to configure the infrastructures. For example, the configuration service may identify what attributes are required for the configuration. In some embodiments, the configuration service may search the customer's usage history, profile, or database to identify the attributes. For example, the configuration service may search the customer's previously configured infrastructure configurations and identify the attributes from the search results. The configuration service may also request the customer to provide the property value of the attributes. In these embodiments, the configuration service may provide a guide, such as a range of property values. In some embodiments, if an error occurs during the infrastructure configuration process, the configuration service may provide a recommendation to solve the error. In some embodiments, the configuration service may download a template that matches the customer input.

Illustratively, a customer may utilize a graphical user interface to create a configuration and modify an existing configuration. In some embodiments, the configuration service provides a graphical user interface (GUI) that can be displayed on the customer computing device. The GUI may include a whiteboard, and a customer can create the network-based services and their corresponding action. By way of example, assume a network service customer wants to create one or more hosted network services/applications and a data storage service connected with each other ("requested services"). In this embodiment, the requested services are visually displayed on a graphical display for receiving customer interaction and commands. Additionally, the graphical display can also represent the relationships and interactions between services in the requested services, such as connecting individual hosted network services to one or more data storage services. For example, the relationships can be represented a solid line that connects the services with additional attributes that might also provide some indication of the types of services or types of interactions that are permitted or otherwise configured. (e.g., the customer drags the services and connect the line).

With continued reference to the current example, the customer may request to deploy the services and their action drawn on the whiteboard, and the configuration service may perform the infrastructure configuration based on the graphical representation. In some embodiments, the customer may modify the existing configuration by modifying the graphical representation on the whiteboard. For example, a customer may add an additional service by dragging the additional service into the whiteboard and adding a line to existing services. The customer may remove service by deleting the service from the whiteboard. These services and the whiteboard are merely provided as examples, and various network-based services and GUIs can be used based on a specific application.

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Additionally, the examples are intended to be illustrative in nature and should not be construed as limiting.

FIG. 1 depicts a block diagram of an embodiment of the system 100. The system 100 can include a network 106, the network connecting a number of customer computing devices 102, and network-based services 112. Illustratively, the various aspects associated with the network service provider 110 can be implemented as one or more components that are associated with one or more functions or services. The components may correspond to software modules implemented or executed by one or more customer computing devices, which may be separate stand-alone customer computing devices. Accordingly, the components of the network service provider 110 should be considered as a logical representation of the service, not requiring any specific implementation on one or more customer computing devices.

Network 106, as depicted in FIG. 1, connects the devices and modules of the system. The network can connect any number of devices. In some embodiments, a network service provider provides network-based services to customer computing devices via a network 106. A network service provider 110 implements network-based services and refers to a large, shared pool of network-accessible computing resources (such as compute, storage, or networking resources, applications, or services), which may be virtualized or bare-metal. The network service provider 110 can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services. In some embodiments, the network may be a content delivery network.

The customer computing device 102 in FIG. 1 can connect to the network and the network service provider 110. The customer computing device 102 may be representative of a computing network associated with a plurality of customer computing devices. Solely for illustration purposes, customer computing device 102 represents a customer's action to access to services 112. Generally, the customer computing device 102 attempts to access and use the services 112 by identifying service 112 and configuring network infrastructure corresponding to the service 112.

The customer computing device 102 can be configured to transmit a request to the network service provider 110 to illustratively access one or more network-based services via the network 106. The customer computing device 102 can be configured to have at least one processor. That processor can be in communication with the memory for maintaining computer-executable instructions. The customer computing device 102 may be physical or virtual. The customer computing devices 102 may be mobile devices, personal computers, servers, or other types of devices. The customer computing device 102 may have a display and input devices through which a user can interact with the user-interface component.

Illustratively, the network service provider 110 can include a plurality of network-based services that can provide functionality responsive to configurations/requests transmitted by the customer computing devices 102, such as in the implementation of a set of microservices that are configured to provide underlying functionality to applications hosted by a service provider. As illustrated in FIG. 1, the network service provider 110 can include a set of network-based services 112A, 112B, 112C, etc. (generally referred to as network-based services, network services, or services). Illustratively, each service can be configured with defined functions that can be accessed based on communication or executable commands. One or more services 112 can be accessed directly with communications transited by the customer computing device 102 via various interfaces. Additionally, one or more services 112 may also be considered dependent services or complimentary services that are accessed based on communications or commands from other services. Such dependent or complimentary services 112 may or may not be directly accessible to communications from the customer computing device 102 (even if the execution of the dependent or complimentary services is being performed on behalf of the customer). Without limitation services 112 can include virtualization services, streaming services, query processing services, data processing services, data storage or warehousing services, analytics services, database services, monitoring services, security services, content delivery services, and the like.

For purposes of the present application, as described herein, each of the services 112A, 112B, 112C can implement some form of network infrastructure configuration process as part of the service configuration process. The network infrastructure configuration can refer to setting network policies, flows, controls, or managing cloud computing infrastructure to access and use the service. In addition, each service can have its own attributes and required values to be configured in an infrastructure configuration process. Illustratively, the service 112 can be automatically configured by performing the infrastructure configuration process corresponding to the service, such as with necessary attributes, to allow the customer to use the service 112.

The network service provider 110 further includes a configuration service 114 that represents the various functions to identify one or more services 112A, 112B, 112C, and automatically perform the infrastructure configuration process corresponding to the identified services 112A, 112B, 112C. In some embodiments, the configuration service 114 may receive customer input. In these embodiments, the configuration service 114 may analyze the customer input to determine services that the customer can use. In some embodiments, the configuration service 114 identifies types of services and actions for the services based on customer input. For example, the customer input may have a specific structure that includes actions such as add, delete, create, etc., followed by service type, such as instance. The customer input can also include a name for the service type, such as EC2. In some embodiments, the customer input can be mapped into a visual representation and displayed on the display of the customer's computing device. Illustratively, configuration service 114 can correspond to one or more computing devices that are configured to provide the customer input to use one or more services. Illustratively, configuration service 114 interacts initially with customer computing devices 102 to receive customer input. In one embodiment, the configuration service 114 may also authenticate the customer's credential information before receiving the customer input. Once the customer provides input and the configuration service 114 receives the customer input, the configuration service 114 can analyze the customer input. The analysis results can provide the customer's needs for using one or more services. For example, if the user input is "create ec2 instance," the configuration service 114 may analyze the input and identify the service that provides the ec2 instance. In some embodiments, the configuration service 114 automatically configures the infrastructure of the identified services by identifying attributes required for the configuration. Illustratively, the configuration service 114 identifies an infrastructure instruction provided by the identified service and performs the infrastructure configuration process. For example, the instruction may provide required attributes for the configuration process, and the configuration service 114 can search for the required attributes. Illustratively, the identity provider service 130 can correspond to a stand-alone service that can be independent of any additional service in the network service provider 110. In other embodiments, the identity provider service 130 can be independent of the network service provider 110. Still further, the number of identity provider service is not limited in this disclosure, and any number of identity provider services can be accessed via the network 106.

The network service provider 110 further includes a machine learned model 118. The machine learned model 118 could be used to assist the network service in analyzing the customer input and/or configuring infrastructure corresponding to services. Illustratively, the machine learned model 118 process the customer's natural language and identify services associated with the customer's natural language. A number of different types of algorithms may be used by the machine learned model 118 to generate the models. The algorithms can include conversational algorithms, dialogue algorithms, and any types of algorithms according to the embodiments as disclosed herein. For example, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learned model 118. Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some embodiments, the network service provider 110 includes datastore 116. Illustratively, infrastructure configuration templates associated with at least one service are stored in the datastore 116. In some embodiments, these configuration templates are created by storing previously processed infrastructure configuration corresponding to a service 112 by a plurality of customers. For example, once the configuration service 114 completes an infrastructure configuration corresponding to a service, its attributes, and any data related to the configuration can be stored in the datastore 116. In some embodiments, the configuration service 114 can recommend one or more templates if the customer input matches with the service corresponding to the template. In one embodiment, the configuration service 114 may recommend the template based on the customer's profile. For example, the configuration service 114 may provide templates that are used by other customers who have a similar profile to the customer. In one embodiment, the configuration service 114 may recommend more than one template. In this embodiment, the configuration service 114 may prioritize the templates based on attributes related to the customer, where the attributes are related to the customer's profile, network usage pattern, and/or privacy level. In still another embodiment, the configuration service 114 may also obtain and store attribute data or other configuration data based on published value preferences or nominal values. Illustratively, the configuration service 114 may implement processes that can scan or survey different information sources for various attribute data associated with one or more of the network services.

In some embodiments, the configuration service 114 can utilize the customer's profile, network usage history, etc., to identify services for the customer. For example, if the customer operates a restaurant and requests a time management service, a service related to managing customers' waiting time can be identified as a higher priority than other services.

In some embodiments, the customer input can be related to updating or modifying one or more existing services currently used by the customer. In these embodiments, the configuration service 114 may determine additional services and configure the infrastructure corresponding to the additional services. In another embodiment, the configuration service 114 can remove or delete one or more existing services based on customer input.

Figure 2:
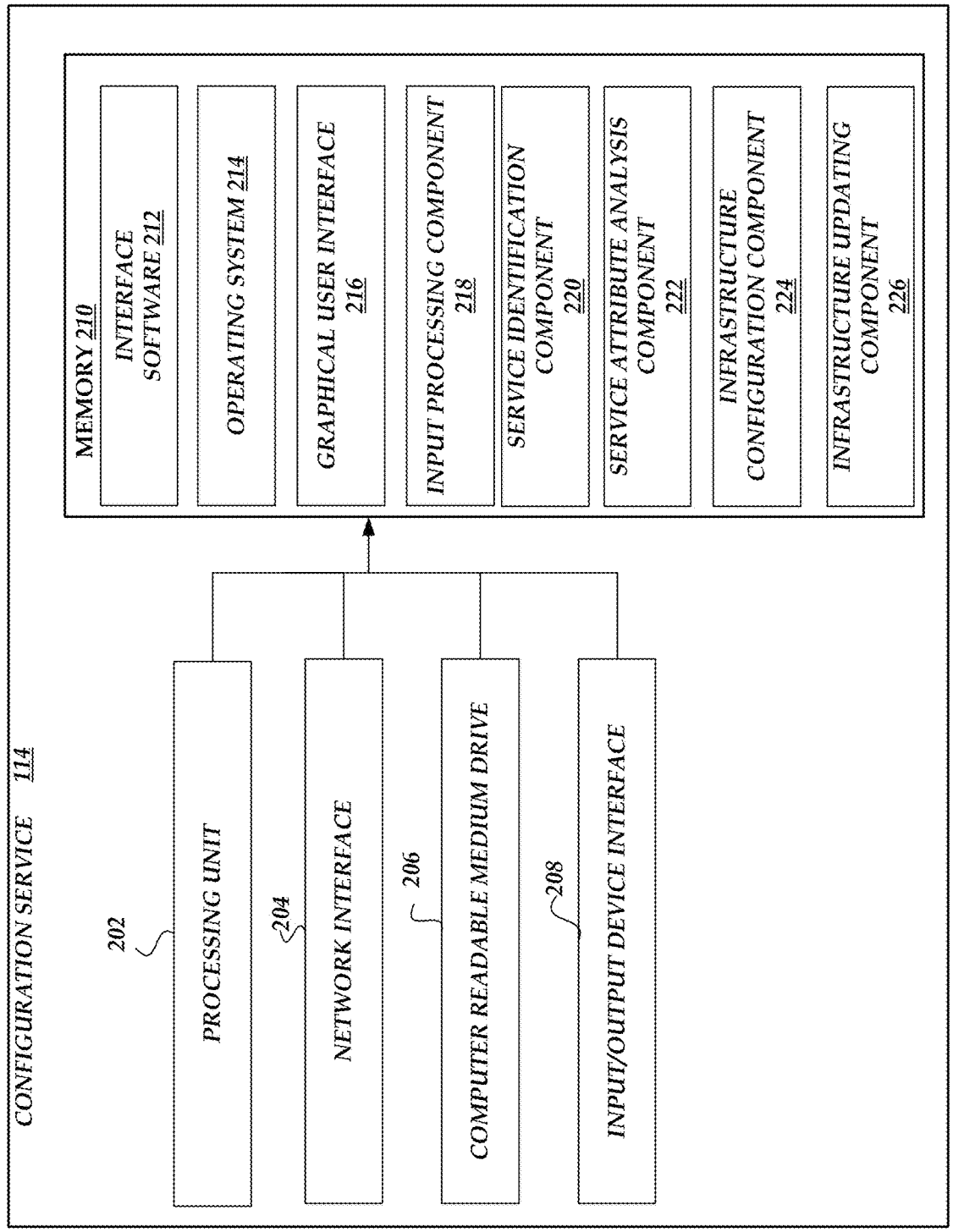
FIG. 2 is a block diagram of illustrative components of a configuration service to configure a network infrastructure based on identifying services and action associated with each service.

FIG. 2 depicts one embodiment of an architecture of an illustrative configuration service 114. The configuration service 114 can be configured to analyze customer input, identify services for the customer, perform network infrastructure configuration corresponding to the identified services, update the existing network infrastructure, provide configuration templates associated with network infrastructure configuration, etc. In some embodiments, the configuration service 114 identifies services based on the customer input by receiving the customer input from a computing device 102 (shown in FIG. 1). The configuration service 114 may identify services needed for the customer based on the customer input. In some embodiments, the configuration service 114 receives a customer's selection of service and configures the infrastructure configuration associated with the customer's selected service. The general architecture of the configuration service 114 depicted in FIG. 2 includes an arrangement of computer hardware and software components that may be used to implement aspects of the present disclosure. As illustrated, the configuration service 114 includes a processing unit 202, a network interface 204, a computer-readable medium drive 206, and an input/output device interface 208, all of which may communicate with one another by way of a communication bus. The components of the configuration service 114 may be physical hardware components or implemented in a virtualized environment.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208. In some embodiments, the configuration service 114 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the configuration service 114. The memory 210 may further include computer program instructions and other information for implementing aspects of the present disclosure. For example, in one embodiment, the memory 210 includes interface software 212 for communicating with other components or services and performing service identification and infrastructure configuration associated with the identified services.

The memory may include a graphical user interface 216 for displaying a visual representation of a customer input and/or one or more services identified and/or configured by the configuration service 114. In some embodiments, the graphical user interface 216 provides a visual layout that can display the whiteboard with drag and drop functions. In these embodiments, the customer may provide input using the visual layout. For example, if the customer want to create a hosted network service and a data storage service connected with each other, the requested services can be visually displayed on a graphical display. The interaction between the services, such as connection points, data flows, throughput, etc. can be represented and manipulated via the graphical display.

In this example, the customer may request to deploy the services and their action drawn on the whiteboard, and the network service may perform the infrastructure configuration based on the graphical representation. In some embodiments, the customer may modify the existing configuration by modifying the graphical representation on the whiteboard. For example, a customer may add an additional service by dragging the additional service into the whiteboard and adding a line to existing services. The customer may remove a service by deleting the service from the whiteboard. The whiteboard with the visual representation can be displayed on the display of the customer computing device 102 (shown in FIG. 1) via the interface software 212 and the network interface 204. For example, a customer may drag a service selected from a list of identified services into the whiteboard, and the infrastructure configuration process associated with the dragged service can be automatically performed.

Additionally, the memory 210 may include an input processing component 218 for processing customer input. In some embodiments, the input processing component 218 analyzes the customer input to identify service needed for the customer. Illustratively, the input processing component 218 identifies types of services and actions for the services based on the customer input. For example, the customer input may have a specific structure that includes actions such as add, delete, create, etc., followed by service type, such as instance. The customer input can also include a name for the service type, such as EC2. In some embodiments, the customer input can be mapped into a visual representation and displays on the display of the customer's computing device. In some embodiments, the input processing component 218 utilizes one or more machine learned models 118 (shown in FIG. 1) to analyze the customer input. In these embodiments, the customer input can be a human natural languages, and the customer, by using an artificial intelligence based communication model embedded in the machine learned model 118, such as a chatbot, can provide the input in a context of human natural language. Based on the input, the machine learned model 118 identifies resources, actions, and service types by processing the human natural languages. For example, the customer input can be a text or speech in a human language context.

The memory 210 may also include a service identification component 220 for identifying services related to the customer input. In some embodiments, the service identification component 220 identifies one or more services related to the customer input. In these embodiments, the list of services can be provided to the customer, and the customer may select one or more services. For example, a list of services identified from the service identification component 220 can be displayed on the customer computing device 102, and the customer may select one or more services. In one example, the list of services identified from the service identification component 220 can be shown in the customer's computing device 102, and the customer may select one or more services by dragging the selected services onto the whiteboard provided in the display of the customer computing device. In some embodiments, the service identification component 220 prioritizes the identified services based on the customer's profile, network service usage history, etc.

In other embodiments, the service identification component 220 may utilize the machine learned model 118 in identifying and/or prioritizing the services. For example, the machine learned model 118 may analyze the customer's profile and identify services that are used by other customers who have a similar profile. Additionally, the machine learned model 118 may prioritize the identified services based on the customer's profile, usage history, etc. For example, if the customer's profile indicates that the customer is has a particular occupation, the machine learned model 118 may provide services that are used by other customers who has the same or similar occupation. In some embodiments, the service identification component 220 recommends services based on analyzing the customer's profile and network usage pattern. In these embodiments, the network service may analyze the customer's profile and usage pattern and recommend another service based on the analyzed results. For example, the network service may analyze a customer's budget and network traffics for using the service. In this example, in determining that the customer needs to reduce cost and the network traffic associated with the service usage is low, the network service may recommend another service that uses fewer network resources with a lower cost.

In some embodiments, the service identification component 220 can provide estimated costs associated with network infrastructure configuration and using network-based services. In these embodiments, the service identification component 220 may estimate network resource usage based on analyzing the customer input can calculate an estimated cost. For example, the service identification component 220 may estimate the network resources usage based on the customer's profile, usage pattern, and type of selected network-based services to determine the required network resources and estimate the cost. In one embodiment, the service identification component 220 may utilize a machine learned model to estimate the network resources usage.

The memory may also include a service attribute analysis component 222 for identifying and verifying attributes required for infrastructure configuration corresponding to the identified services. In some embodiments, each service includes an instruction to perform an infrastructure configuration corresponding to the service. The instruction may include attributes used to perform the configuration, and the instruction can be embedded in the service in a text file format. In these embodiments, service attribute analysis component 222 searches each service's embedded instruction that includes one or more attributes required for the infrastructure configurations. The instruction can be in the form of a text file and embedded as a document file in associated services. In some embodiments, the service attribute analysis component 222 may identify the attributes by analyzing the instruction and searching for the attributes. For example, the service attribute analysis component 222 may search the customer's usage history and any accessible resources, such as network servers, databases, etc. The service attribute analysis component 222 also may provide a guide to the customer to define a property value associated with an attribute. The guide may include a normal value range for the property value. In some embodiments, the service attribute analysis component 222 may search the datastore 116 and download the attributes if the datastore 116 includes services having similar infrastructure configuration with the customer input.

The memory may also include an infrastructure configuration component 224. The identified service can be implemented in various network infrastructure configurations. For example, a service, such as a hosted network service/application, can be configured in various configurations based on the customer's specific input or needs. These configurations can be referred to as infrastructure configuration, and the infrastructure configuration may define network policies, flows, controls, or managing cloud computing infrastructure resources. In some embodiments, the infrastructure configuration component 224 may identify the infrastructure configuration and attributes to configure the configuration. In these embodiments, the infrastructure configuration component 224 may utilize a variety of data related to the customer to identify the infrastructure configuration. For example, the data can include the customer's profile, network service usage (i.e., previously configured infrastructure configuration), the customer's privacy level, etc. In some embodiments, the infrastructure configuration component 224 utilizes attributes identified in the service attribute analysis component 222 to perform the infrastructure configuration. In some embodiments, the infrastructure configuration component 224 searches the datastore 116 to find a template that can be used for the infrastructure configuration. In these embodiments, the infrastructure configuration component 224 may apply criteria to determine whether the template can be used, such that the infrastructure configuration component 224 may use the template with the same or similar customer profile, privacy level, network usage, etc. For example, assume a customer is a restaurant owner and uses network services that can manage restaurant reservations via a set of network services. The infrastructure configuration component 224 can either recommend or provide a template that is been created by other customers that can be recommended to the customer. These recommendations can be based on explicit customer indications (e.g., show me store owner templates) or via inferred behaviors or matched attributes. These are provided as examples, and various criteria can be used to determine whether the customer can use a template.

The memory may also include an infrastructure updating component 226. In some embodiments, the infrastructure updating component 226 may update an existing services' infrastructure configuration by reconfiguring the infrastructure configuration. In some embodiments, the customer may request to add new services or remove one or more existing services. In these embodiments, the infrastructure updating component 226 may identify the updated attributes and reconfigure the infrastructure configuration. For example, if the customer adds a new service, attributes related to the new service can be identified and verified. The verified attributes can be used to update the infrastructure configuration to include the new service.

The memory 210 shown in FIG. 2 is merely illustrated as an example, and the present disclosure is not limited thereto, and one or more system components, computing devices or processors can be used to execute computer program instructions that the processing unit 202 executes in order to implement one or more embodiments disclosed in the present disclosure. Accordingly, reference to memory is intended in a general sense and should not be construed as limiting to any particular embodiment or configuration.

Figure 3A:
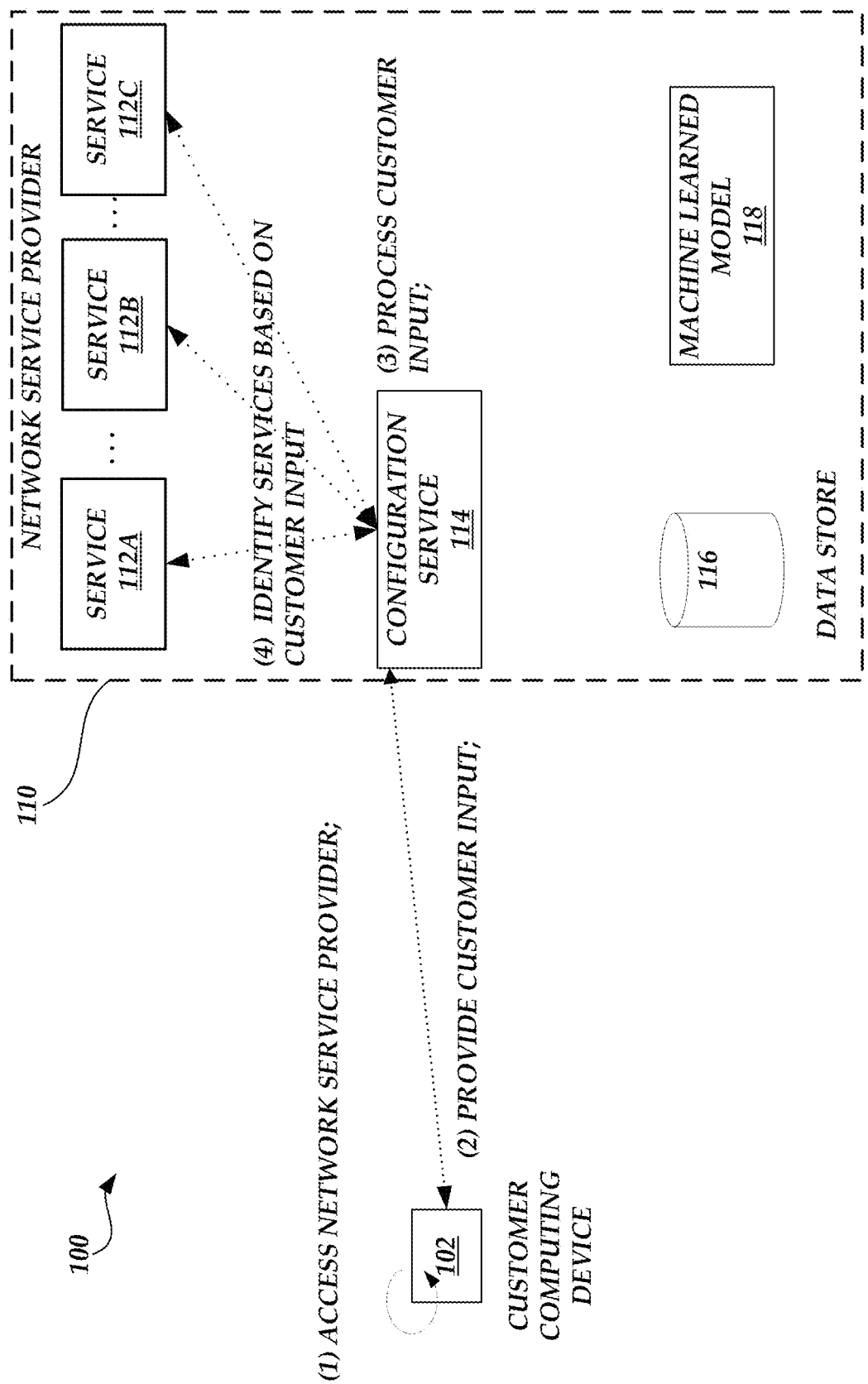
FIG. 3A is an illustrative interaction of identification of services based on analyzing a customer input and/or pattern.
Figure 3B:
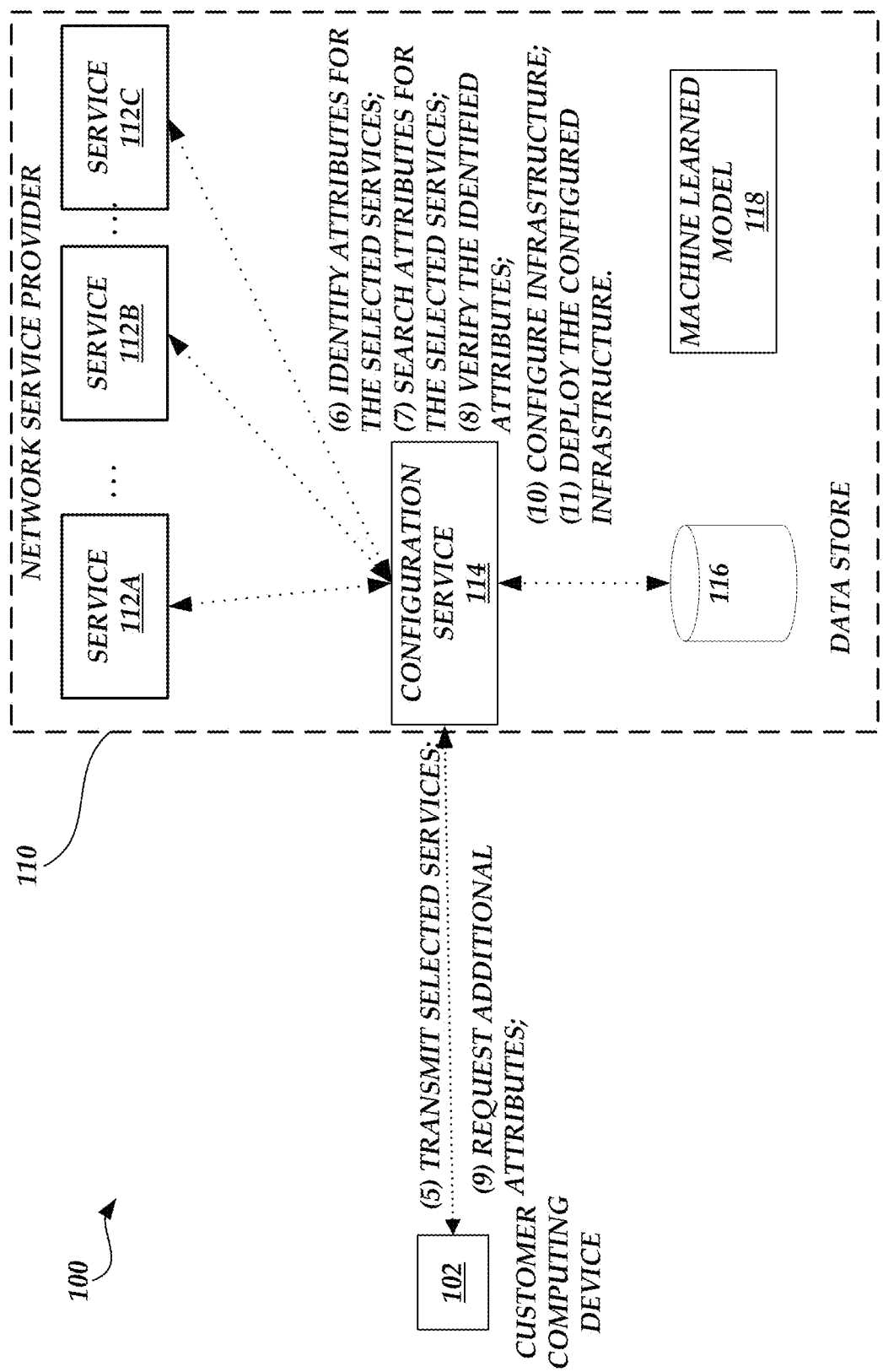
FIG. 3B is an illustrative interaction of network infrastructure configuration based on the identified services.

Turning now to FIGS. 3A-3C, illustrative interactions of the components of the system 100, as shown in FIG. 1, will be described. For purposes of the illustration, it can be assumed that a network provider 110 has been configured in a manner to implement a plurality of network services 112 on behalf of a customer. The present application is not intended to be limited to any particular type of service or the number of individual services that may be accessed or generate processing results as part of an execution of an application on behalf of customers. Furthermore, the present application is not intended to be limited to the number of network service providers, as depicted in FIG. 1.

With reference to FIG. 3A, an illustrative interaction of identification of services based on analyzing a customer input and/or pattern, will be described. The interaction is illustrative. At (1), a customer may log in to the network service provider. In some embodiments, the network service provider provides a service platform such as a cloud.

At (2), the customer may provide customer input. The customer may provide the customer input by utilizing a graphical user interface (GUI). In some embodiments, the configuration service 114 provides a graphical user interface (GUI) for displaying a visual representation of customer input on the customer computing device 102. In some embodiments, the graphical user interface 216 provides a visual layout that can display the whiteboard with drag and drop functions. In these embodiments, the customer may provide input using the visual layout. For example, if the customer wants to create an EC2 service and S3 bucket connected with each other, the EC2 service and S3 bucket are visually displayed on the whiteboard, and its action, such as connecting the EC2 and S3, can be represented as a solid line that connects the EC2 and S3 bucket (e.g., the customer drags the services and connect the line). In this example, the customer may request to deploy the services and their action drawn on the whiteboard, and the network service may perform the infrastructure configuration based on the graphical representation. In some embodiments, the customer may modify the existing configuration by modifying the graphical representation on the whiteboard. For example, a customer may add an additional service by dragging the additional service into the whiteboard and adding a line to existing services. The customer may remove a service by deleting the service from the whiteboard. The whiteboard with the visual representation can be displayed on the display of the customer computing device 102 (shown in FIG. 1) via the interface software 212 and the network interface 204. For example, a customer may drag a service selected from a list of identified services into the whiteboard, and the infrastructure configuration process associated with the dragged service can be automatically performed.

Further at (2), in some embodiments, the customer may provide an input by artificial intelligence (AI) based input models, such as a chatbot, or any type of text format. In some embodiments, the configuration service 114 is configured to utilize a machine learned model 118 to receive a customer input. In these embodiments, the machine learned model 118 may provide an AI based input model, such as a chatbot. For example, when the customer access to the network service provider, the configuration service 114 may provide a chatbot by displaying the chatbot on the customer computing device. In this example, the customer may provide input by typing or speaking to the chatbot.

At (3), the configuration service 114 may process the customer input. In some embodiments, the configuration service 114 analyzes the customer input to identify services and actions (e.g., service configuration action, such as creating, adding, deleting services) needed for the customer. In these embodiments, the configuration service 114 may identify types of services and actions for the services based on the customer input. For example, the customer input may have a specific structure that includes actions such as add, delete, create, etc., followed by service type, such as instance. In some embodiments, the customer may provide the input by visual representation. In these embodiments, the configuration service 114 may determine services and actions included in the visual representation. For example, if the customer represented EC2 service connected with S3 bucket, the configuration service 114 may process the visual representation to identify the services, EC2 and S3 buckets, and an action, connecting these two services.

Further at (3), in some embodiments, the configuration service 114 utilizes a machine learned model 118 (shown in FIG. 1) to analyze the customer input. In these embodiments, the customer input can be a human natural language, and the customer, by using an artificial intelligence based communication component embedded in the machine learned model 118 such as a chatbot, can provide the input in a context of human natural language. Based on the input, the machine learned model 118 identifies resources, action, and service types by processing the human natural languages. For example, the customer input can be text or speech in a human language context.

At (4), the configuration service 114 identifies one or more services related to the customer input. In some embodiments, a list of services can be provided to the customer, and the customer may select one or more services. For example, a list of services identified at (2) can be displayed on the customer computing device 102, and the customer may select one or more services. In one example, the customer may select one or more services by dragging the selected services onto the whiteboard provided in the display of the customer computing device.

Further at (4), in some embodiments, the configuration service 114 prioritize the identified services based on the customer's profile, network service usage history, etc. In other embodiments, the configuration service 114 may utilize the machine learned model 118 in identifying and/or prioritizing the services. For example, the machine learned model 118 may analyze the customer's profile and identify services that are used by other customers who has a similar profile. Additionally, the machine learned model 118 may prioritize the identified services based on the customer's profile, usage history, etc. For example, if the customer's profile indicates that the customer is has a particular occupation, the machine learned model 118 may provide services that are used by other customers who has the same or similar occupation. In some embodiments, the configuration service 114 recommends services based on analyzing the customer's profile and network usage pattern. In these embodiments, the configuration service 114 may analyze the customer's profile and usage pattern and recommend another service based on the analyzed results. For example, the network service may analyze a customer's budget and a network traffic for using the service. In this example, in determining that the customer needs to reduce cost and the network traffic associated with the service usage is low, the configuration service 114 may recommend another service that uses fewer network resources with a lower cost.

In some embodiments, the configuration service 114 can provide estimated cost associated with configuring and using network-based services. In these embodiments, the configuration service 114 may estimate network resource usage based on analyzing the customer input and calculate an estimated cost. For example, the configuration service 114 may estimate the network resources usage based on the customer's profile, usage pattern, and type of services to determine required network resources and estimate the cost. In one embodiment, the configuration service 114 may utilize a machine learned model 118 to estimate the network resources usage.

After identifying services based on the customer input, the identified services can be configured in a network platform, such as a cloud platform, by performing infrastructure configuration. With reference to FIG. 3B, an illustrative interaction of network infrastructure configuration based on the identified services will be described. The interaction is illustrative. At (5), a customer may select at least one service from a list of identified services and transmit the selected service. In other embodiments, the customer may provide the services as customer input. In these embodiments, the customer may not need to select the services, and the network service may configure the services provided by the customer as customer input.

At (6), the configuration service 114 may identify attributes required for infrastructure configuration corresponding to the selected services. In some embodiments, each service includes an instruction to perform an infrastructure configuration corresponding to the service. The instruction may include attributes used to perform the configuration, and the instruction can be embedded in the service in a text file format. In these embodiments, configuration service 114 searches each service's embedded instruction that includes one or more attributes required for the infrastructure configurations. The instruction can be in a form of a text file and embedded as a document file in associated services. In some embodiments, the configuration service 114 may search the customer's usage history and any accessible resources, such as network servers, databases, etc.

In some embodiments, the customer may provide one or more attributes to perform the infrastructure configuration. In these embodiments, the customer may provide input by a machine learned algorithm that incorporates input models. Such machine learned algorithms that include conversational machine-learned algorithms, such as a chatbot, or any type of text format. For example, the input models may include conversational machine-learned-based chatbot, and the customer can provide the attributes to the chatbot. In this example, the customer may conversate with the machine-learned-based chatbot. The machine-learned-based can extract, from the conversation with the customer, one or more attributes required in the infrastructure configuration.

At (7), the configuration service 114 may search attributes required for infrastructure configuration corresponding to the selected services. In some embodiments, the configuration service 114 identifies the attributes for the selected services without requiring a network connection to the services 112. In these embodiments, the configuration service 114 stores the attributes, including property values associated with each attribute and instructions for identifying the attributes, associated with the services 112 in performing the infrastructure configuration and utilizes the stored attributes and instructions to perform the infrastructure configuration. For example, each service 112 may include documentations that include attributes required by the service 112 and/or instructions for identifying the attributes. In this example, the configuration service 114 periodically access to the services 112 and stores the documentations into an internal storage of the configuration service 114 or the datastore 116. Thus, during the infrastructure configuration process, the configuration service 114 can identify the attributes and instructions corresponding to one or more services 112 by using the stored documentations without requiring the network connection to the services 112. In some embodiments, the (7) can be performed in the (6). In some embodiments, both of the (6) and (7) are performed for the infrastructure configuration. In one embodiments, either the (6) or (7) can be performed for the infrastructure configuration.

At (8), the configuration service 114 may verify a property value associated with each identified attribute corresponding to a service. At (9), in some embodiments, the configuration service 114 requests the customer to input a property value associated with an attribute. In these embodiments, the configuration service 114 may provide a guide to the customer to define or input a property value associated with an attribute. This guide may include a normal value range for the property value. In some embodiments, the configuration service 114 may search the datastore 116 and download the attributes if the datastore 116 includes services having similar infrastructure configuration with the customer input. In some embodiments, at (9), the configuration service 114 may request additional attributes to the customer via the customer computing device 102.

At (10), the configuration service 114 may configure the infrastructure using the identified services and actions associated with the services. The identified services can be implemented in various infrastructure configurations. For example, a service, such as EC2, can be configured in various configurations based on the customer's specific input or needs. These configurations can be referred to as infrastructure configuration, and the infrastructure configuration may define network policies, flows, controls, or managing cloud computing infrastructure resources. In some embodiments, the configuration service 114 utilizes the verified attributes to perform the infrastructure configuration. In these embodiments, the configuration service 114 may also utilize a variety of data related to the customer to perform the infrastructure configuration. For example, the data can include the customer's profile, network service usage (i.e., previously configured infrastructure configuration), the customer's privacy level, etc. In some embodiments, the configuration service 114 may recommend one or more infrastructure configuration templates. In these embodiments, the configuration service 114 may search the datastore 116 to find a template that can be used for the infrastructure configuration. For example, the configuration service 114 may apply criteria to determine whether the template can be used, such that the configuration service 114 may use the template that has a same or similar customer profile, privacy level, network usage, etc. For example, if the customer is a restaurant owner and uses services that can manage a restaurant reservation, a template created by another customer who is also a similar type restaurant owner with a similar number of restaurant customers can be recommended to the customer. These are provided as examples, and various criteria can be used to determine whether the customer can use a template.

At (11), the network infrastructure based on the identified services can be deployed. In some embodiments, the configuration service 114 may detect an error and provides it to the customer. In these embodiments, the configuration service 114 can provide instruction to the customer to resolve the error. For example, if an error is caused by a parameter value associated with an attribute, the configuration service 114 may provide a proper parameter value range that can be used for the attribute.

With reference FIG. 3C, an illustrative interaction of updating existing services configured in a network infrastructure based on analyzing customer input will be described. The interaction is illustrative. At (1), a customer may log in to the network service provider. In some embodiments, the network service provider provides a service platform such as a cloud At (2), the customer may provide customer input. In some embodiments, the configuration service 114 provides a graphical user interface (GUI) for displaying a visual representation of customer input on the customer computing device 102. In these embodiments, the configuration service 114 provides a visual layout that displays an existing infrastructure configuration. In some embodiments, the customer may modify the existing infrastructure configuration by modifying the graphical representation on the whiteboard, such that a customer may add an additional service by dragging the additional service into the whiteboard and adding a line to existing services. For example, if the customer wants to add an EC2 service to the existing configuration, the customer may select the EC2 and drag into the existing configuration and connect the additional EC2 to the existing configuration. The customer may remove service by deleting the service from the whiteboard.

Further at (2), in some embodiments, the customer may provide input by an artificial intelligence (AI) based input models, such as a chatbot, or any type of text format. In some embodiments, the configuration service 114 is configured to utilize a machine learned model 118 to receive customer input. In some embodiments, the customer may modify the existing configuration by providing input in a human language context. For example, a customer may provide input in a human natural language such as "add another EC2," then the configuration service 114 may process the natural language to add another EC2 to an existing configuration.

At (3), the configuration service 114 may process the customer input. In some embodiments, the configuration service 114 analyzes the customer input to identify services (e.g., services that need to be modified) and action (e.g., service configuration action, such as creating, adding, and deleting services). In these embodiments, the configuration service 114 may identify types of services and actions for the services based on the customer input. For example, the customer input may have a specific structure that includes actions such as add, delete, create, etc., followed by service type, such as instance. In some embodiments, the customer may provide the input by visual representation. In these embodiments, the configuration service 114 may determine services and actions included in the visual representation. For example, if the customer adds another EC2 service to an existing configuration, the configuration service 114 may process the visual representation to identify the additional EC2, and an action connecting an existing configuration.

Further at (3), in some embodiments, the input processing component 218 utilizes a machine learned model 118 (shown in FIG. 1) to analyze the customer input. In these embodiments, the customer input can be a human natural languages, and the customer, by using an artificial intelligence based communication component embedded in the machine learned model 118 such as a chatbot, can provide the input in a context of human natural language. Based on the input, the machine learned model 118 identifies resources, actions, and service types by processing the human natural languages. For example, the customer input can be text or speech in a human language context.

At (4), the configuration service 114 identifies one or more services related to the customer input. In some embodiments, a list of services can be provided to the customer, and the customer may select one or more services. For example, a list of services identified at (2) can be displayed on the customer computing device 102, and the customer may select one or more services. In one example, the customer may select one or more services by dragging the selected services onto the whiteboard that shows an existing configuration representation.

In some embodiments, the configuration service 114 can provide estimated cost associated with re-configuring or modifying the existing infrastructure configuration. In these embodiments, the configuration service 114 may estimate network resource usage by analyzing customer input and calculating an estimated cost. For example, the configuration service 114 may estimate the network resources usage based on the customer's profile, usage pattern, and type of services to determine required network resources and estimate the cost. In one embodiment, the configuration service 114 may utilize a machine learned model 118 to estimate network resource usage.

At (5), the configuration service 114 may identify additional attributes required for modifying an existing infrastructure configuration. In some embodiments, each service include an instruction to perform an infrastructure configuration corresponding to the service. The instruction may include attributes used to perform the configuration, and the instruction can be embedded in the service in a text file format. In these embodiments, configuration service 114 searches the additional service's embedded instruction that includes one or more attributes required for the infrastructure configurations. The instruction can be in the form of a text file and embedded as a document file in associated services. In some embodiments, if the customer modifies the existing infrastructure configuration by removing one or more services, the attributes related to the removed services can be deleted or modified.

At (6), the configuration service 114 may update the existing infrastructure configuration. At (7), the configuration service 114 may deploy the updated infrastructure configuration.

Figure 4A:
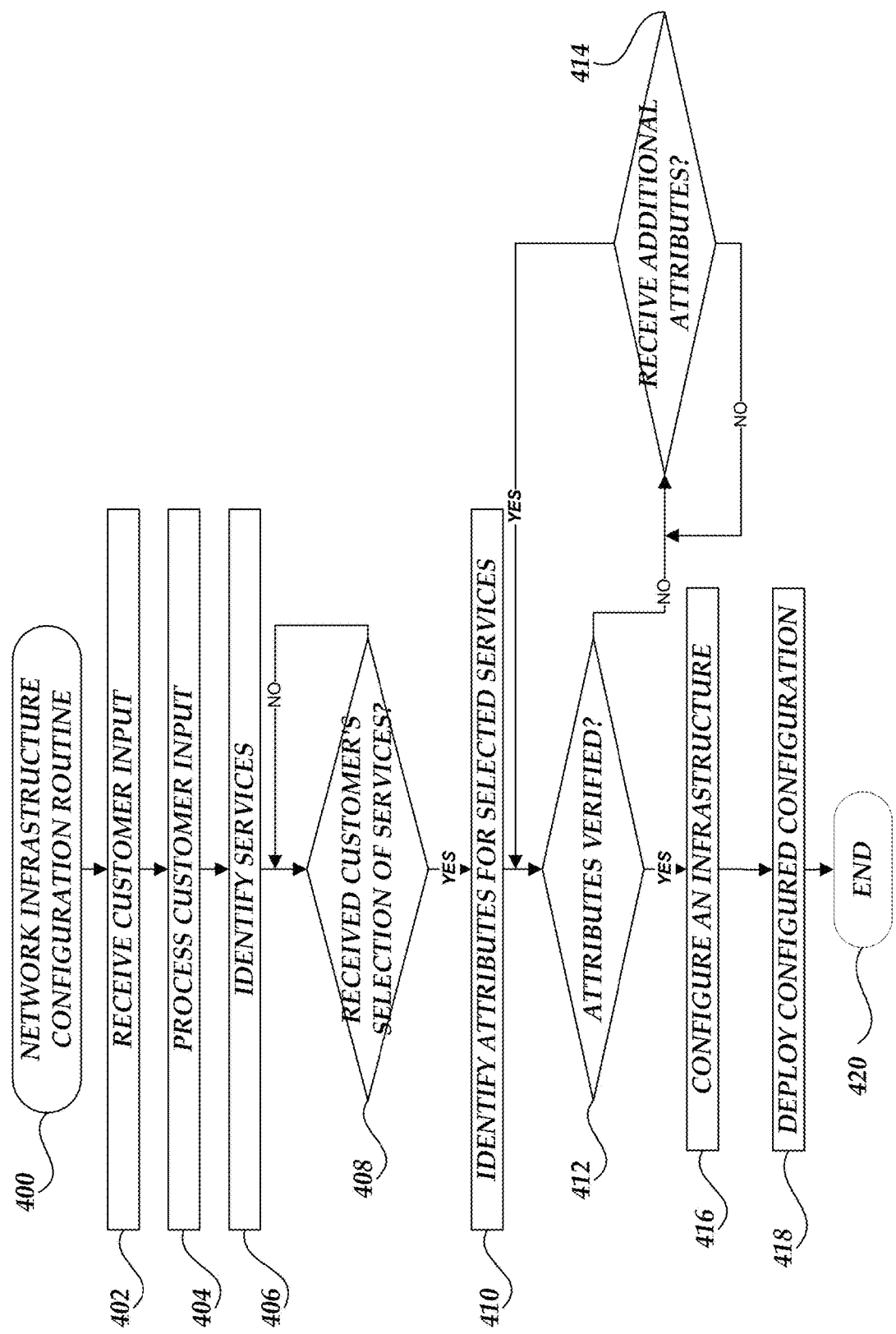
FIG. 4A is a flow diagram illustrative of a routine for network infrastructure configuration routine utilizing a configuration service.

Turning now to FIG. 4A, a routine 400 for network infrastructure configuration routine utilizing a configuration service 114 will be described.

At block 402, the customer may provide a customer input. The customer may provide the customer input by utilizing a graphical user interface (GUI). In some embodiments, the configuration service 114 provides a graphical user interface (GUI) for displaying a visual representation of customer input on the customer computing device 102. In some embodiments, the graphical user interface 216 provides a visual layout that can display the whiteboard with drag and drop functions. In these embodiments, the customer may provide input using the visual layout. For example, if the customer wants to create an EC2 service and S3 bucket connected with each other, the EC2 service and S3 bucket are visually displayed on the whiteboard, and their actions, such as connecting the EC2 and S3, can be represented as a solid line that connects the EC2 and S3 bucket (e.g., the customer drags the services and connect the line). In this example, the customer may request to deploy the services and their action drawn on the whiteboard, and the network service may perform the infrastructure configuration based on the graphical representation. In some embodiments, the customer may modify the existing configuration by modifying the graphical representation on the whiteboard. For example, a customer may add an additional service by dragging the additional service into the whiteboard and adding a line to existing services. The customer may remove a service by deleting the service from the whiteboard. The whiteboard with the visual representation can be displayed on the display of the customer computing device 102 (shown in FIG. 1). For example, a customer may drag a service selected from a list of identified services into the whiteboard, and the infrastructure configuration process associated with the dragged service can be automatically performed.

Further at block 402, in some embodiments, the customer may provide an input by utilizing an artificial intelligence (AI) based input model, such as a chatbot, or any type of text format. In some embodiments, the configuration service 114 is configured to utilize a machine learned model 118 to receive a customer input. In these embodiments, the machine learned model 118 may provide an AI based input model, such as a chatbot. For example, when the customer access to the network service provider, the configuration service 114 may provide a chatbot by displaying the chatbot on the customer computing device. In this example, the customer may provide input by typing or speaking to the chatbot.

At block 404, the configuration service 114 may process the customer input. In some embodiments, the configuration service 114 analyzes the customer input to identify services and actions (e.g., service configuration action, such as creating, adding, deleting services) needed for the customer. In these embodiments, the configuration service 114 may identify types of services and actions for the services based on customer input. For example, the customer input may have a specific structure that includes actions such as add, delete, create, etc., followed by service type, such as instance. In some embodiments, the customer may provide the input by visual representation. In these embodiments, the configuration service 114 may determine services and actions included in the visual representation. For example, if the customer represented EC2 service connected with S3 bucket, the configuration service 114 may process the visual representation to identify the services, EC2 and S3 buckets, and an action connecting these two services.

Further at block 404, in some embodiments, the input processing component 218 utilizes a machine learned model 118 (shown in FIG. 1) to analyze the customer input. In these embodiments, the customer input can be a human natural languages, and the customer, by using an artificial intelligence based communication component embedded in the machine learned model 118 such as a chatbot, can provide the input in a context of human natural language. Based on the input, the machine learned model 118 identifies resources, action, and service type by processing the human natural languages. For example, the customer input can be a text or speech in a human language context.

At block 406, the configuration service 114 identifies one or more services related to the customer input. In some embodiments, a list of services can be provided to the customer, and the customer may select one or more services. For example, a list of services identified at (2) can be displayed on the customer computing device 102, and the customer may select one or more services. In one example, the customer may select one or more services by dragging the selected services onto the whiteboard provided in the display of the customer computing device.

Further at block 406, in some embodiments, the configuration service 114 prioritizes the identified services based on the customer's profile, network service usage history, etc. In other embodiments, the configuration service 114 may utilize the machine learned model 118 in identifying and/or prioritizing the services. For example, the machine learned model 118 may analyze the customer's profile and identify services that are used by other customers who has a similar profile. Additionally, the machine learned model 118 may prioritize the identified services based on the customer's profile, usage history, etc. For example, if the customer's profile indicates that the customer has a particular occupation, the machine learned model 118 may provide services that are used by another customer with a similar occupation. In some embodiments, the configuration service 114 recommends services based on analyzing the customer's profile and network usage pattern. In these embodiments, the configuration service 114 may analyze the customer's profile and usage pattern and recommend another service based on the analyzed results. For example, the network service may analyze a customer's budget and network traffic for using the service. In this example, in determining that the customer needs to reduce cost and the network traffic associated with the service usage is low, the configuration service 114 may recommend another service that uses fewer network resources with a lower cost.

In some embodiments, the configuration service 114 can provide estimated cost associated with configuring and using network-based services. In these embodiments, the configuration service 114 may estimate network resource usage based on analyzing the customer input and calculating an estimated cost. For example, the configuration service 114 may estimate the network resources usage based on the customer's profile, usage pattern, and type of services to determine required network resources and estimate the cost. In one embodiment, the configuration service 114 may utilize a machine learned model 118 to estimate network resource usage.

At block 408, a customer may select at least one service from a list of identified services and transmit the selected service. In other embodiments, the customer may provide the services as a customer input. In these embodiments, the customer may not need to select the services, and the network service may configure the services provided by the customer as customer input.

In determining that the customer selected the services, the process continues to block 410. If the customer did not select the services, the process remains at block 408 until receiving the customer's selection of services.

At block 410, the configuration service 114 may identify attributes required for infrastructure configuration corresponding to the identified services. In some embodiments, each service includes an instruction to perform an infrastructure configuration corresponding to the service. The instruction may include attributes used to perform the configuration, and the instruction can be embedded in the service in a text file format. In these embodiments, configuration service 114 searches each service's embedded instruction that includes one or more attributes required for the infrastructure configurations. The instruction can be in the form of a text file and embedded as a document file in associated services. In some embodiments, the configuration service 114 may search the customer's usage history and any accessible resources, such as network servers, databases, etc.

At block 412, the configuration service 114 may verify a property value associated with each identified attribute corresponding to a service. At block 414, in some embodiments, if one or more attributes are not verified, the configuration service 114 requests to the customer to input property values associated with the attributes. In these embodiments, the configuration service 114 may provide a guide to the customer to define or input a property value associated with an attribute. This guide may include a normal value range for the property value. If the customer provides the additional property values associated with the attributes, the attributes with additional property values can be verified at block 412.

At block 416, the configuration service 114 may configure the infrastructure using the identified services and actions associated with the services. The identified services can be implemented in various infrastructure configurations. For example, a service, such as EC2, can be configured in various configurations based on the customer's specific input or needs. These configurations can be referred to as infrastructure configuration, and the infrastructure configuration may define network policies, flows, controls, or managing cloud computing infrastructure resources. In some embodiments, configuration service 114 utilizes the verified attributes to perform the infrastructure configuration. In these embodiments, the configuration service 114 may also utilize a variety of data related to the customer to perform the infrastructure configuration. For example, the data can include the customer's profile, network service usage (i.e., previously configured infrastructure configuration), the customer's privacy level, etc. In some embodiments, the configuration service 114 searches the datastore 116 to find a template that can be used for the infrastructure configuration. In these embodiments, the configuration service 114 may apply criteria to determine whether the template can be used, such that the configuration service 114 may use the template that has the same or similar customer profile, privacy level, network usage, etc. For example, if the customer is a restaurant owner and uses services that can manage a restaurant reservation, a template that has been created by another customer who is also a similar type restaurant owner having a similar number of restaurant customers can be recommended to the customer. These are provided as examples, and various criteria can be used to determine whether the customer can use a template.

At block 418, the network infrastructure based on the identified services can be deployed.

In some embodiments, the configuration service 114 may detect an error and provides it to the customer. In these embodiments, the configuration service 114 can provide instruction to the customer to resolve the error. For example, if an error is caused by a parameter value associated with an attribute, the configuration service 114 may provide a proper parameter value range that can be used for the attribute. The network infrastructure configuration routine 400 can be ended at block 420.

Figure 4B:
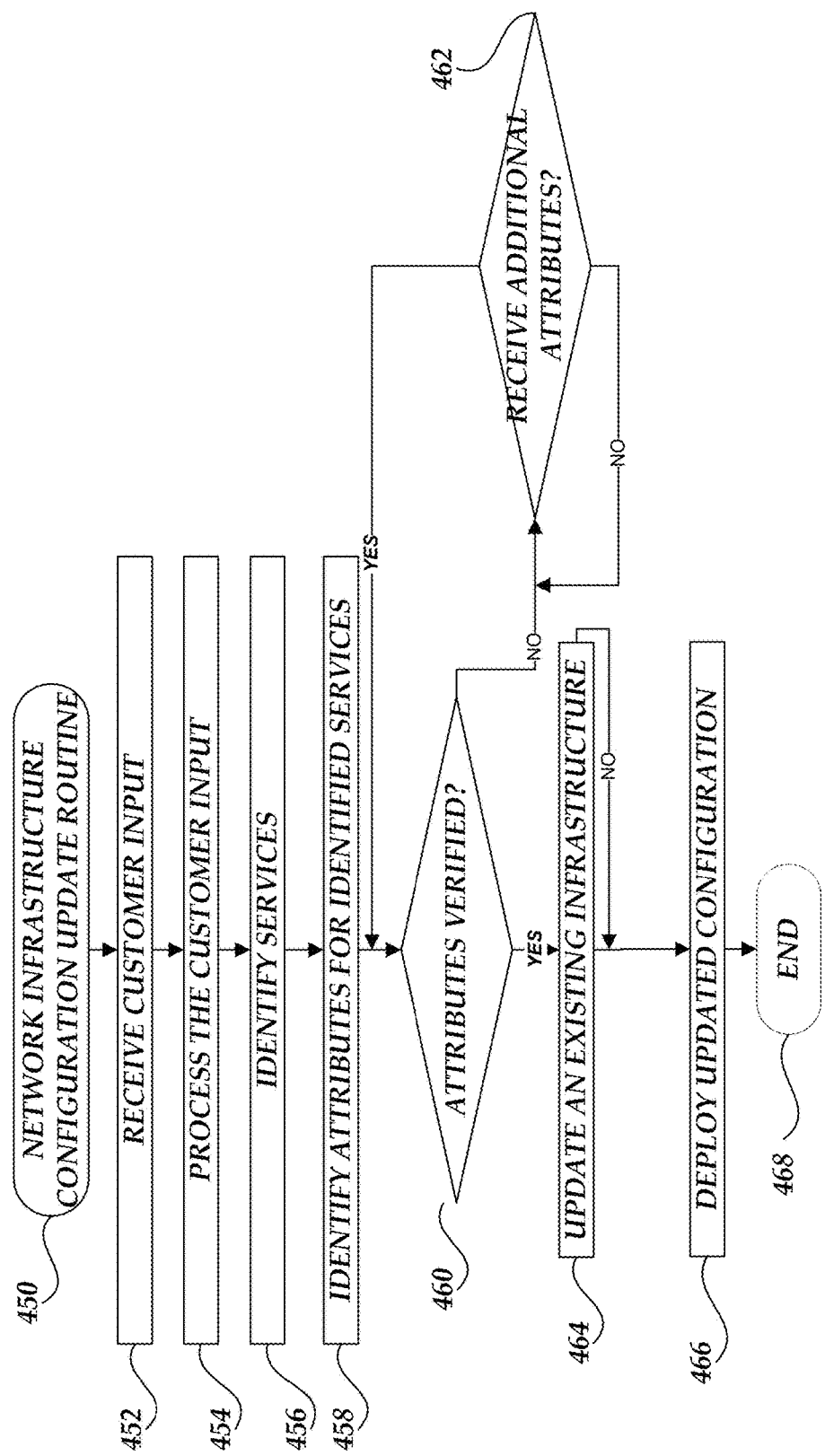
FIG. 4B is a flow diagram illustrative of a routine for network infrastructure configuration update routine utilizing a configuration service.

Turning now to FIG. 4B, a routine 450 for network infrastructure configuration update routine utilizing a configuration service 114 will be described.

At block 452, the customer may provide customer input. In some embodiments, the configuration service 114 provides a graphical user interface (GUI) for displaying a visual representation of customer input on the customer computing device 102.

In these embodiments, the configuration service 114 provides a visual layout that displays an existing network infrastructure configuration. In some embodiments, the customer may modify the existing network infrastructure configuration by modifying the graphical representation on the whiteboard, such that a customer may add an additional service by dragging the additional service into the whiteboard and adding a line to existing services. For example, if the customer wants to add an EC2 service to the existing configuration, the customer may select the EC2 and drag into the existing configuration and connect the additional EC2 to the existing configuration. The customer may remove a service by deleting the service from the whiteboard.

Further at block 452, in some embodiments, the customer may provide an input by artificial intelligence (AI) based input models, such as a chatbot, or any type of text format. In some embodiments, the configuration service 114 is configured to utilize a machine learned model 118 to receive customer input. In some embodiments, the customer may modify the existing configuration by providing an input in a human language context. For example, a customer may provide input in a human natural language such as "add another EC2," then the configuration service 114 may process the natural language to add another EC2 to an existing configuration.

At block 454, the configuration service 114 may process the customer input. In some embodiments, the configuration service 114 analyzes the customer input to identify services (e.g., services that need to be modified) and actions (e.g., service configuration action, such as creating, adding, and deleting services). In these embodiments, the configuration service 114 may identify types of services and actions for the services based on the customer input. For example, the customer input may have a specific structure that includes actions such as add, delete, create, etc., followed by service type, such as instance. In some embodiments, the customer may provide the input by visual representation. In these embodiments, the configuration service 114 may determine services and actions included in the visual representation. For example, if the customer adds another EC2 service to an existing configuration, the configuration service 114 may process the visual representation to identify the additional EC2, and an action, connecting an existing configuration.

Further at block 454, in some embodiments, the input processing component 218 utilizes a machine learned model 118 (shown in FIG. 1) to analyze the customer input. In these embodiments, the customer input can be a human natural languages, and the customer, by using an artificial intelligence based communication component embedded in the machine learned model 118 such as a chatbot, can provide the input in a context of human natural language. Based on the input, the machine learned model 118 identifies resources, action, and service types by processing the human natural languages. For example, the customer input can be a text or speech in a human language context.

At block 456, the configuration service 114 identifies one or more services related to the customer input. In some embodiments, a list of services can be provided to the customer, and the customer may select one or more services. For example, a list of services identified at (2) can be displayed on the customer computing device 102, and the customer may select one or more services. In one example, the customer may select one or more services by dragging the selected services onto the whiteboard that shows an existing configuration representation.

In some embodiments, the configuration service 114 can provide estimated cost associated with re-configuring or modifying the existing configuration. In these embodiments, the configuration service 114 may estimate network resource usage based on analyzing the customer input and calculating an estimated cost. For example, the configuration service 114 may estimate the network resources usage based on the customer's profile, usage pattern, and type of services to determine required network resources and estimate the cost. In one embodiment, the configuration service 114 may utilize a machine learned model 118 to estimate the network resources usage.

At block 458, the configuration service 114 may identify additional attributes required for modifying an existing infrastructure configuration based on the identified services at block 456. In some embodiments, each service includes an instruction to perform an infrastructure configuration corresponding to the service. The instruction may include attributes used to perform the configuration, and the instruction can be embedded in the service in a text file format. In these embodiments, configuration service 114 searches the additional service's embedded instruction that includes one or more attributes required for the infrastructure configurations. The instruction can be in the form of a text file and embedded as a document file in associated services. In some embodiments, if the customer modifies the existing infrastructure configuration by removing one or more services, the attributes related to the removed services can be deleted or modified.

At block 460, the configuration service 114 may verify a property value associated with each identified attribute corresponding to the identified services. At block 462, in some embodiments, if one or more attributes are not verified, the configuration service 114 requests to the customer to input property values associated with the attributes. In these embodiments, the configuration service 114 may provide a guide to the customer to define or input a property value associated with an attribute. This guide may include a normal value range for the property value. If the customer provides the additional property values associated with the attributes, the attributes with additional property values can be verified at block 460.

Figure 5A:
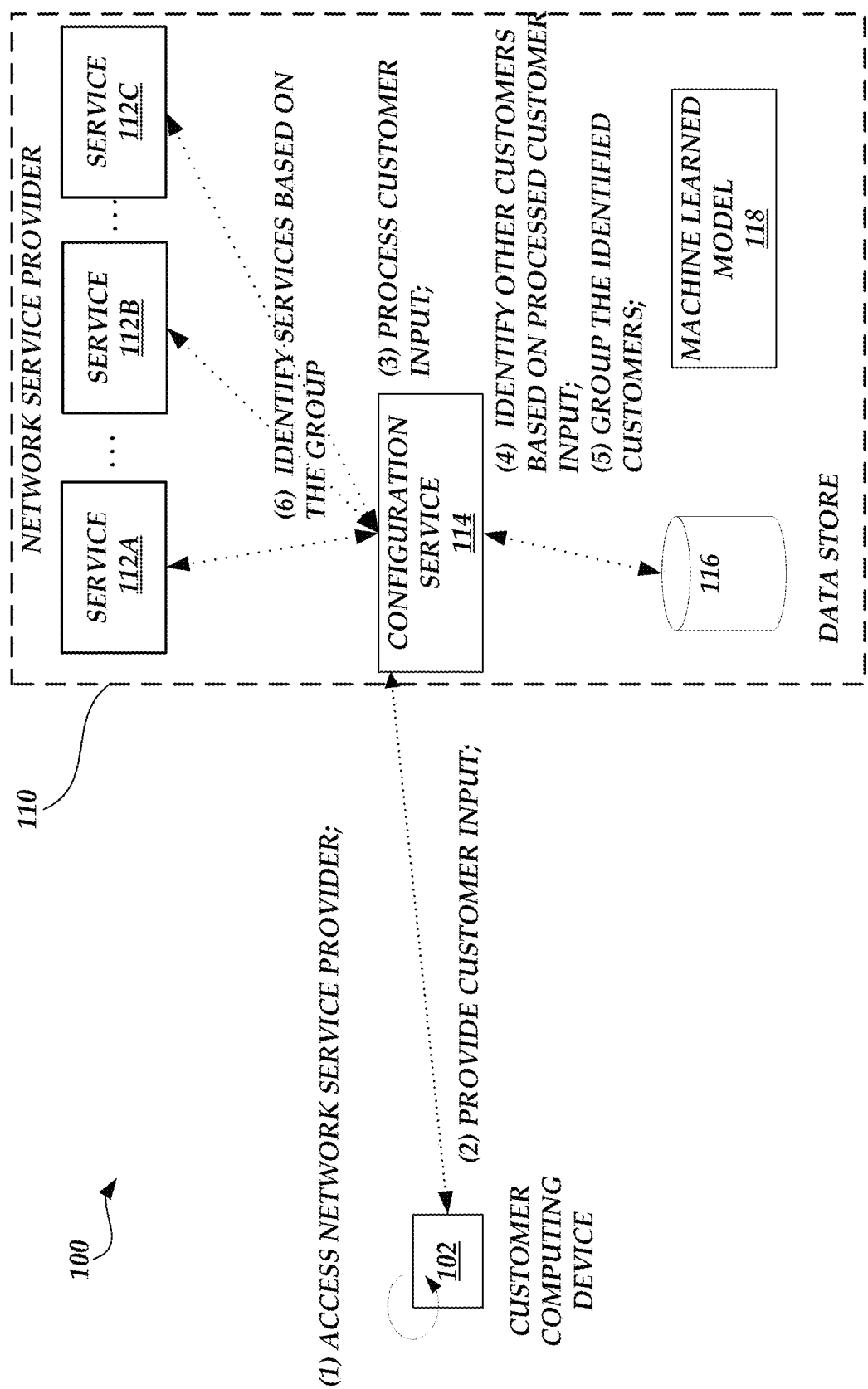
FIG. 5A is an illustrative interaction of identification of services based on analyzing a customer input and/or pattern according to one or more embodiments.
Figure 5B:
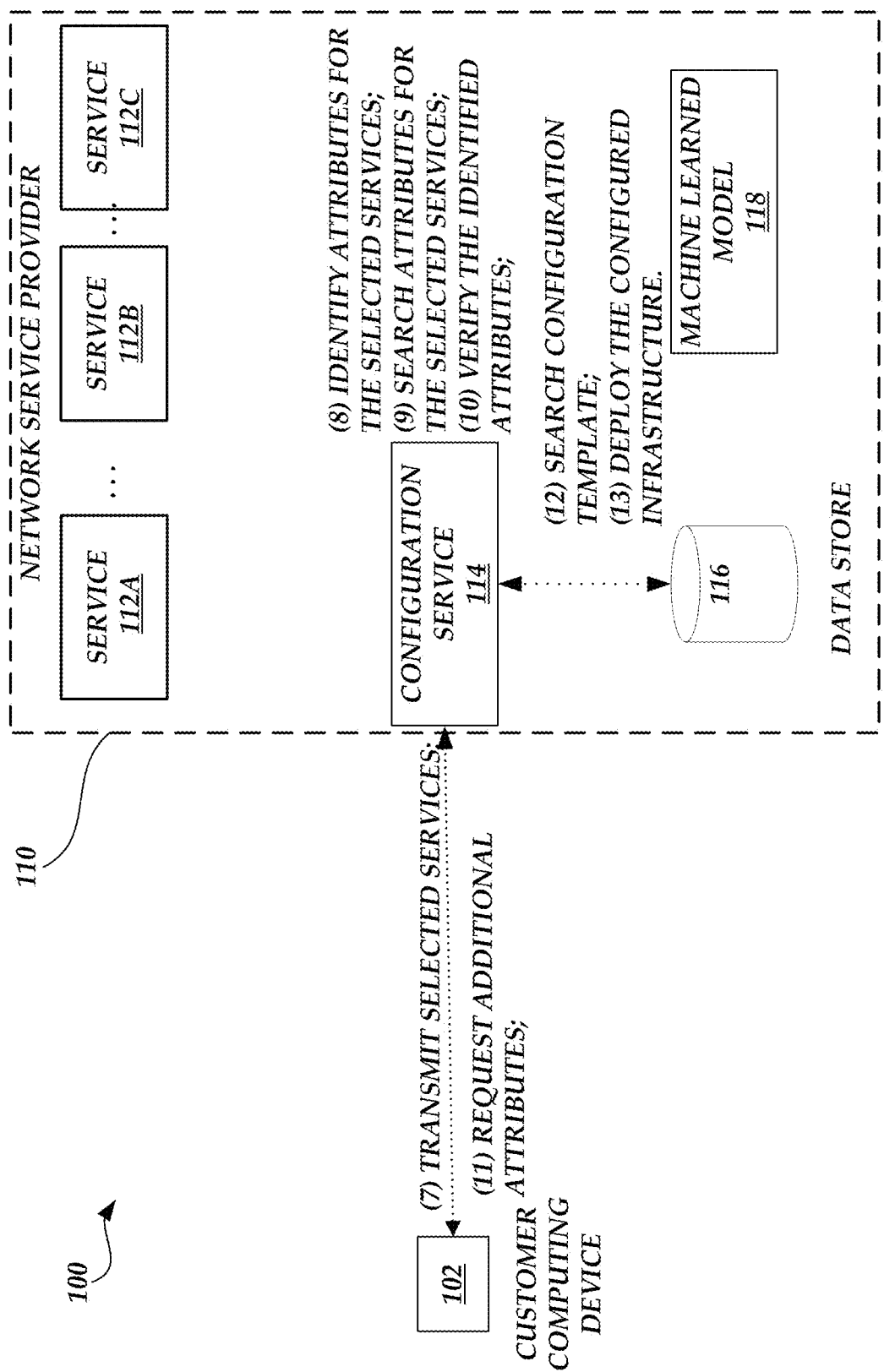
FIG. 5B is an illustrative interaction of network infrastructure configuration based on the identified services according to one or more embodiments.

Turning now to FIGS. 5A-5B, illustrative interactions of the components, according to an alternative embodiments of the system 100, as shown in FIG. 1, will be described. For purposes of the illustration, it can be assumed that a network provider 110 has been configured in a manner to implement a plurality of network services 112 on behalf of a customer. The present application is not intended to be limited to any particular type of service or the number of individual services that may be accessed or generate processing results as part of an execution of an application on behalf of customers. Furthermore, the present application is not intended to be limited to the number of network service providers, as depicted in FIG. 1.

With reference to FIG. 5A, an illustrative interaction of identification of services based on analyzing a customer input and/or pattern, will be described. The interaction is illustrative. At (1), a customer may log in to the network service provider. In some embodiments, the network service provider provides a service platform such as a cloud.

At (2), the customer may provide customer input. The customer may provide the customer input by utilizing a graphical user interface (GUI). In some embodiments, the configuration service 114 provides a graphical user interface (GUI) for displaying a visual representation of customer input on the customer computing device 102. In some embodiments, the graphical user interface 216 provides a visual layout that can display the whiteboard with drag and drop functions. In these embodiments, the customer may provide input using the visual layout. For example, if the customer wants to create an EC2 service and S3 bucket connected with each other, the EC2 service and S3 bucket are visually displayed on the whiteboard, and its action, such as connecting the EC2 and S3, can be represented as a solid line that connects the EC2 and S3 bucket (e.g., the customer drags the services and connect the line). In this example, the customer may request to deploy the services and their action drawn on the whiteboard, and the network service may perform the infrastructure configuration based on the graphical representation. In some embodiments, the customer may modify the existing configuration by modifying the graphical representation on the whiteboard. For example, a customer may add an additional service by dragging the additional service into the whiteboard and adding a line to existing services. The customer may remove a service by deleting the service from the whiteboard. The whiteboard with the visual representation can be displayed on the display of the customer computing device 102 (shown in FIG. 1) via the interface software 212 and the network interface 204. For example, a customer may drag a service selected from a list of identified services into the whiteboard, and the infrastructure configuration process associated with the dragged service can be automatically performed.

Further at (2), in some embodiments, the customer may provide an input by artificial intelligence (AI) based input models, such as a chatbot, or any type of text format. In some embodiments, the configuration service 114 is configured to utilize a machine learned model 118 to receive a customer input. In these embodiments, the machine learned model 118 may provide an AI based input model, such as a chatbot. For example, when the customer access to the network service provider, the configuration service 114 may provide a chatbot by displaying the chatbot on the customer computing device. In this example, the customer may provide input by typing or speaking to the chatbot.

At (3), the configuration service 114 may process the customer input. In some embodiments, the configuration service 114 may identify the customer's profile. The customer's profile, for example, can include the customer's network usage pattern, network usage history, previous activities, interaction with one or more businesses, demographic data, preference on network services, privacy level, etc. The customer's profile is not limited to these examples, and the customer may provide the profile by selecting one or more profiles that the customer would like to provide. In some embodiments, the configuration service 114 analyzes the customer input to identify services and actions (e.g., service configuration action, such as creating, adding, deleting services) needed for the customer. In these embodiments, the configuration service 114 may identify types of services and actions for the services based on the customer input. For example, the customer input may have a specific structure that includes actions such as add, delete, create, etc., followed by service type, such as instance. In some embodiments, the customer may provide the input by visual representation. In these embodiments, the configuration service 114 may determine services and actions included in the visual representation. For example, if the customer represented EC2 service connected with S3 bucket, the configuration service 114 may process the visual representation to identify the services, EC2 and S3 buckets, and an action, connecting these two services.

Further at (3), in some embodiments, the configuration service 114 utilizes a machine learned model 118 (shown in FIG. 1) to analyze the customer input. In these embodiments, the customer input can be a human natural language, and the customer, by using an artificial intelligence based communication component embedded in the machine learned model 118 such as a chatbot, can provide the input in a context of human natural language. Based on the input, the machine learned model 118 identifies the customer's profile and/or resources, action, and service types by processing the human natural languages. For example, the customer input can be text or speech in a human language context.

At (4), the configuration service 114 identifies other customers based on the processed customer input. In some embodiments, the processed customer input includes the identified customer profile at (3). For example, the processed customer input may include the customer's interacted business. In this example, the configuration service 114 may identify other customers, by accessing to the datastore 116, who have the same interacted business. At (5) the configuration service 114 may group the identified customers.

At (6), the configuration service 114 identifies one or more services related to the customer input. In some embodiments, a list of services that the identified other customers at (4) have used previously can be provided to the customer, and the customer may select one or more services. For example, a list of services used by the group of the customers can be displayed on the customer computing device 102, and the customer may select one or more services. In one example, the customer may select one or more services by dragging the selected services onto the whiteboard provided in the display of the customer computing device.

Further at (6), in some embodiments, the configuration service 114 prioritize the identified services based on the similarity of the customer's profile with other customers in the group. In other embodiments, the configuration service 114 may utilize the machine learned model 118 in identifying and/or prioritizing the services. For example, the machine learned model 118 may analyze the customer's profile and identify services that are used by other customers who has a similar profile. Additionally, the machine learned model 118 may prioritize the identified services based on the customer's profile, usage history, etc. For example, if the customer's profile indicates that the customer is has a particular occupation, the machine learned model 118 may provide services that are used by other customers who has the same or similar occupation. In some embodiments, the configuration service 114 recommends services based on analyzing the customer's profile and network usage pattern. In these embodiments, the configuration service 114 may analyze the customer's profile and usage pattern and recommend another service based on the analyzed results. For example, the network service may analyze a customer's budget and a network traffic for using the service. In this example, in determining that the customer needs to reduce cost and the network traffic associated with the service usage is low, the configuration service 114 may recommend another service that uses fewer network resources with a lower cost.

In some embodiments, the configuration service 114 can provide estimated cost associated with configuring and using network-based services. In these embodiments, the configuration service 114 may estimate network resource usage based on analyzing the customer input and calculate an estimated cost. For example, the configuration service 114 may estimate the network resources usage based on the customer's profile, usage pattern, and type of services to determine required network resources and estimate the cost. In one embodiment, the configuration service 114 may utilize a machine learned model 118 to estimate the network resources usage.

After identifying services based on the customer input, the identified services can be configured in a network platform, such as a cloud platform, by performing infrastructure configuration. With reference to FIG. 5B, an illustrative interaction of network infrastructure configuration based on the identified services will be described. The interaction is illustrative. At (7), a customer may select at least one service from a list of identified services and transmit the selected service. In other embodiments, the customer may provide the services as customer input. In these embodiments, the customer may not need to select the services, and the network service may configure the services provided by the customer as customer input.

At (8), the configuration service 114 may identify attributes required for infrastructure configuration corresponding to the selected services. In some embodiments, each service includes an instruction to perform an infrastructure configuration corresponding to the service. The instruction may include attributes used to perform the configuration, and the instruction can be embedded in the service in a text file format. In these embodiments, configuration service 114 searches each service's embedded instruction that includes one or more attributes required for the infrastructure configurations. The instruction can be in a form of a text file and embedded as a document file in associated services. In some embodiments, the configuration service 114 may search the customer's usage history and any accessible resources, such as network servers, databases, etc.

In some embodiments, the customer may provide one or more attributes to perform the infrastructure configuration. In these embodiments, the customer may provide input by an artificial intelligence (AI) based input models that include conversational AI algorithms, such as a chatbot, or any type of text format. For example, the AI based input models may include conversational AI chatbot, and the customer can provide the attributes to the chatbot. In this example, the customer may conversate with the AI chatbot, and the AI can extract, from the conversation with the customer, one or more attributes required in the infrastructure configuration.

At (9), the configuration service 114 may search attributes required for infrastructure configuration corresponding to the selected services. In some embodiments, the configuration service 114 identifies the attributes for the selected services without requiring a network connection to the services 112. In these embodiments, the configuration service 114 stores the attributes, including property values associated with each attribute and instructions for identifying the attributes, associated with the services 112 in performing the infrastructure configuration and utilizes the stored attributes and instructions to perform the infrastructure configuration. For example, each service 112 may include documentations that include attributes required by the service 112 and/or instructions for identifying the attributes. In this example, the configuration service 114 periodically access to the services 112 and stores the documentations into an internal storage of the configuration service 114 or the datastore 116. Thus, during the infrastructure configuration process, the configuration service 114 can identify the attributes and instructions corresponding to one or more services 112 by using the stored documentations without requiring the network connection to the services 112. In some embodiments, the (9) can be performed in the (8). In some embodiments, both of the (8) and (9) are performed for the infrastructure configuration. In one embodiment, either the (8) or (9) can be performed for the infrastructure configuration.

At (10), the configuration service 114 may verify a property value associated with each identified attribute corresponding to a service. At (9), in some embodiments, the configuration service 114 requests the customer to input a property value associated with an attribute. In these embodiments, the configuration service 114 may provide a guide to the customer to define or input a property value associated with an attribute. This guide may include a normal value range for the property value. In some embodiments, the configuration service 114 may search the datastore 116 and download the attributes if the datastore 116 includes services having similar infrastructure configuration with the customer input. In some embodiments, at (11), the configuration service 114 may request additional attributes to the customer via the customer computing device 102.

At (12), the configuration service 114 may search one or more infrastructure configuration templates. In some embodiments, the datastore 116 may include a plurality of infrastructure configuration templates. In one embodiment, the datastore 116 may store the plurality of infrastructure templates by associating the each template with a customer's (e.g., a user of the template) profile. In some embodiments, the configuration service 114 may search one or more templates from the plurality of infrastructure templates based on the customer's profile. For example, the configuration service 114 may search the templates that are used by other customers in the group identified at (5) (shown in FIG. 5A). In some embodiments, the configuration service 114 may provide the templates by prioritizing the templates. For example, the configuration service 114 may prioritizes the templates based on the similarities of the user's profile with the customer's profile. Further in this example, if the customer is operating a restaurant, the templates that are previously used by another customer who is in the same group and operating the same type of restaurant with the customer can be provided with a higher prioritization than other templates.

Further at (12), in some embodiments, the configuration service 114 configures the infrastructure using the identified services and actions associated with the services. The identified services can be implemented in various infrastructure configurations. For example, a service, such as a network-based hosted application or network-based service that can provide specifically configured applications or functionality, can be configured in various configurations based on the customer's specific input or needs. These configurations can be referred to as infrastructure configuration, and the infrastructure configuration may define network policies, flows, controls, or managing cloud computing infrastructure resources. In some embodiments, the configuration service 114 utilizes the verified attributes to perform the infrastructure configuration. In these embodiments, the configuration service 114 may also utilize a variety of data related to the customer to perform the infrastructure configuration. For example, the data can include the customer's profile, network service usage (i.e., previously configured infrastructure configuration), the customer's privacy level, etc.

In some embodiments, the configuration service 114 may recommend one or more infrastructure configuration templates. In these embodiments, the configuration service 114 may search the datastore 116 to find a template that can be used for the infrastructure configuration. For example, the configuration service 114 may apply criteria to determine whether the template can be used, such that the configuration service 114 may use the template that has a same or similar customer profile, privacy level, network usage, etc. By way of illustration, assume a customer is a restaurant owner and uses services that can manage a restaurant reservation. In this example a template created by another network-based service customer who may be associated in a profile as a similar type restaurant owner, or similar number of restaurant customers, or similar data requirements, etc. can be recommended to the customer. These are provided as examples, and various criteria can be used to determine whether the customer can use a template.

At (13), the network infrastructure based on the identified services and templates can be deployed. In some embodiments, the configuration service 114 may detect an error and provides it to the customer. In these embodiments, the configuration service 114 can provide instruction to the customer to resolve the error. For example, if an error is caused by a parameter value associated with an attribute, the configuration service 114 may provide a proper parameter value range that can be used for the attribute.

Figure 6:
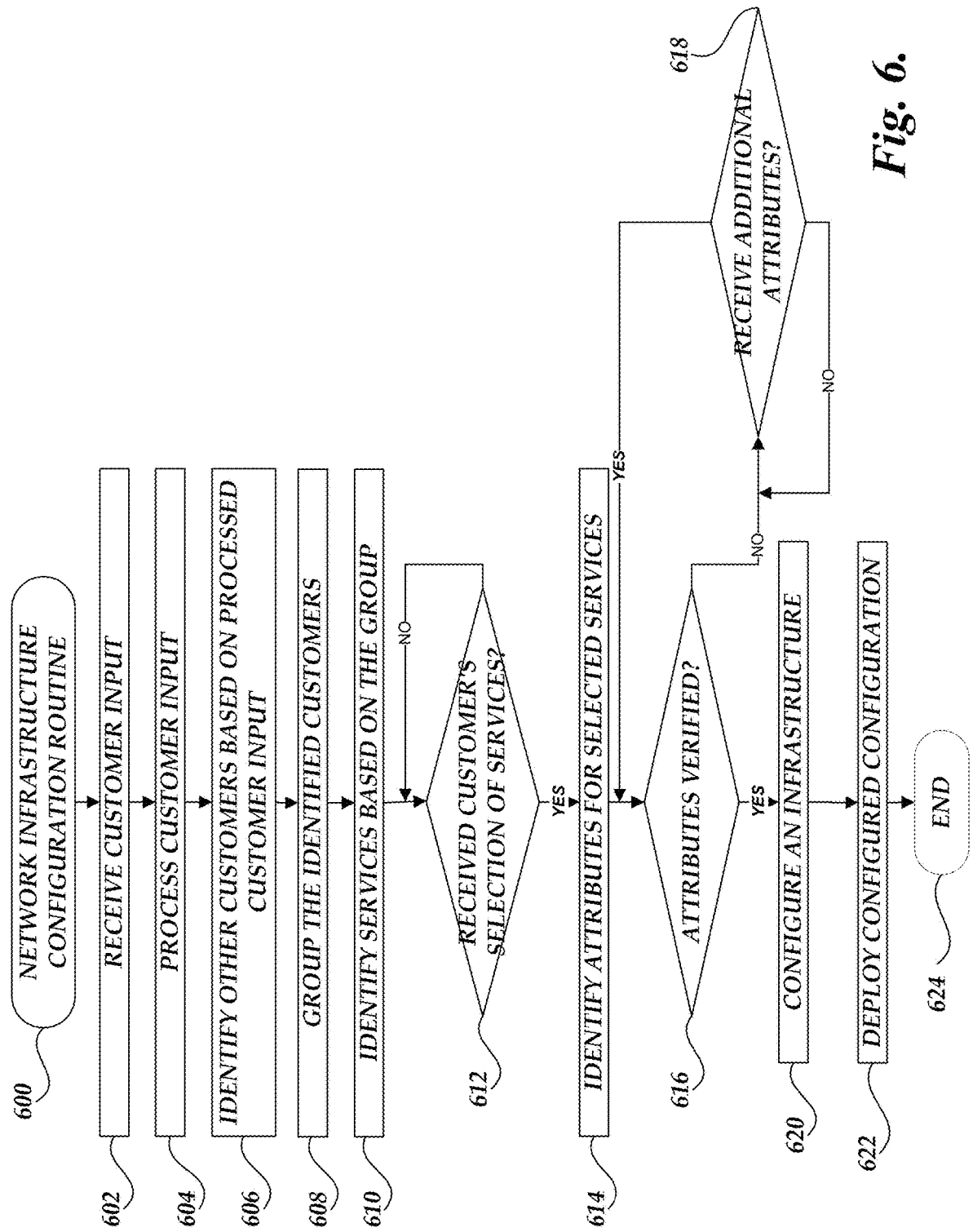
FIG. 6 is a flow diagram illustrative of a routine for network infrastructure configuration routine utilizing a configuration service.

Turning now to FIG. 6, a routine 600 for network infrastructure configuration routine utilizing a configuration service 114 will be described.

At block 602, the customer may provide a customer input. The customer may provide the customer input by utilizing a graphical user interface (GUI). In some embodiments, the configuration service 114 provides a graphical user interface (GUI) for displaying a visual representation of customer input on the customer computing device 102. In some embodiments, the graphical user interface 216 (shown in FIG. 2) provides a visual layout that can display the whiteboard with drag and drop functions. In these embodiments, the customer may provide input using the visual layout. For example, if the customer wants to create a hosted service or hosted application and data storage service (e.g., "the requested services") connected with each other, the representations of the individual services of the hosted services are visually displayed on the whiteboard. Additionally, the relationships and interactions between the requested services, such as connecting one or more hosted services with the data storage service, can be represented visually, such as solid line that might represent interconnections and interconnection types. In this example, the customer may request to deploy the services and their action drawn on an interactive interface, such as virtual whiteboard feature, and the network service may perform the infrastructure configuration based on the graphical representation of the requested services.

In some embodiments, the customer may modify the existing configuration by modifying the graphical representation on the interface. For example, a customer may add an additional service by dragging the additional service into the whiteboard and adding a line to existing services. The customer may remove a service by deleting the service from the whiteboard. The whiteboard with the visual representation can be displayed on the display of the customer computing device 102 (shown in FIG. 1). For example, a customer may drag a service selected from a list of identified services into the whiteboard, and the infrastructure configuration process associated with the dragged service can be automatically performed.

Further at block 602, in some embodiments, the customer may provide an input by utilizing a machine-learned-based input model, such as a chatbot, or any type of text format. In some embodiments, the configuration service 114 is configured to utilize a machine learned model 118 to receive a customer input. In these embodiments, the machine learned model 118 may provide a machine-learned-based input model, such as a chatbot. For example, when the customer access to the network service provider, the configuration service 114 may provide a chatbot by displaying the chatbot on the customer computing device. In this example, the customer may provide input by typing or speaking to the chatbot.

At block 604, the configuration service 114 may process the customer input. In some embodiments, the configuration service 114 may identify the customer's profile. The customer's profile, for example, can include the customer's network usage pattern, network usage history, previous activities, interaction with one or more businesses, demographic data, preference on network services, etc. The customer's profile is not limited to these examples, and the customer may provide the profile by selecting one or more profiles that the customer would like to provide. In some embodiments, the configuration service 114 analyzes the customer input to identify services and actions (e.g., service configuration action, such as creating, adding, deleting services) needed for the customer. In these embodiments, the configuration service 114 may identify types of services and actions for the services based on the customer input. For example, the customer input may have a specific structure that includes actions such as add, delete, create, etc., followed by service type, such as instance. In some embodiments, the customer may provide the input by visual representation. In these embodiments, the configuration service 114 may determine services and actions included in the visual representation. With reference to the previous example, if the customer represented a hosted network service or hosted application service connected with a data storage service, the configuration service 114 may process the visual representation to identify the requested services, and an action or processing connecting these two services.

Further at block 604, in some embodiments, the configuration service 114 utilizes a machine learned model 118 (shown in FIG. 1) to analyze the customer input. In these embodiments, the customer input can be a human natural language, and the customer, by using a machine-learned-based communication component embedded in the machine learned model 118 such as a chatbot, can provide the input in a context of human natural language. Based on the input, the machine learned model 118 identifies the customer's profile and/or resources, action, and service types by processing the human natural languages. For example, the customer input can be text or speech in a human language context.

At block 606, the configuration service 114 identifies other customers based on the processed customer input. In some embodiments, the processed customer input includes the identified customer profile at block 604. For example, the processed customer input may include the customer's interacted business. In this example, the configuration service 114 may identify other customers, by accessing to the datastore 116, who have the same interacted business. At block 608, the configuration service 114 may group the identified customers.

At block 610, the configuration service 114 identifies one or more services related to the customer input. In some embodiments, a list of services that the identified other customers have used previously can be provided to the customer, and the customer may select one or more services. For example, a list of services used by the group of the customers can be displayed on the customer computing device 102, and the customer may select one or more services. In one example, the customer may select one or more services by dragging the selected services onto the graphical interface, e.g., a whiteboard, provided in the display of the customer computing device.

Further at block 610, in some embodiments, the configuration service 114 prioritize the identified services based on the similarity of the customer's profile with other customers in the group. In other embodiments, the configuration service 114 may utilize the machine learned model 118 in identifying or prioritizing the services. For example, the machine learned model 118 may analyze the customer's profile and identify services that are used by other customers who has a similar profile. Additionally, the machine learned model 118 may prioritize the identified services based on the customer's profile, usage history, etc. For example, if the customer's profile indicates that the customer is has a particular occupation, the machine learned model 118 may provide services that are used by other customers who has the same or similar occupation. In some embodiments, the configuration service 114 recommends services based on analyzing the customer's profile and network usage pattern. In these embodiments, the configuration service 114 may analyze the customer's profile and usage pattern and recommend another service based on the analyzed results. For example, the network service may analyze a customer's budget and a network traffic for using the service. In this example, in determining that the customer needs to reduce cost and the network traffic associated with the service usage is low, the configuration service 114 may recommend another service that uses fewer network resources with a lower cost.

In some embodiments, the configuration service 114 can provide estimated cost associated with configuring and using network-based services. In these embodiments, the configuration service 114 may estimate network resource usage based on analyzing the customer input and calculate an estimated cost. For example, the configuration service 114 may estimate the network resources usage based on the customer's profile, usage pattern, and type of services to determine required network resources and estimate the cost. In one embodiment, the configuration service 114 may utilize a machine learned model 118 to estimate the network resources usage.

At block 612, a customer may select at least one service from a list of identified services and transmit the selected service. In other embodiments, the customer may provide the services as a customer input. In these embodiments, the customer may not need to select the services, and the network service may configure the services provided by the customer as customer input.

In determining that the customer selected the services, the process continues to block 614. If the customer did not select the services, the process remains at block 612 until receiving the customer's selection of services.

At block 614, the configuration service 114 may identify attributes required for infrastructure configuration corresponding to the identified services. In some embodiments, each service includes an instruction to perform an infrastructure configuration corresponding to the service. The instruction may include attributes used to perform the configuration, and the instruction can be embedded in the service in a text file format. In these embodiments, configuration service 114 searches each service's embedded instruction that includes one or more attributes required for the infrastructure configurations. The instruction can be in the form of a text file and embedded as a document file in associated services. In some embodiments, the configuration service 114 may search the customer's usage history and any accessible resources, such as network servers, databases, etc.

At block 616, the configuration service 114 may verify a property value associated with each identified attribute corresponding to a service. At block 618, in some embodiments, if one or more attributes are not verified, the configuration service 114 requests to the customer to input property values associated with the attributes. In these embodiments, the configuration service 114 may provide a guide to the customer to define or input a property value associated with an attribute. This guide may include a normal value range for the property value. If the customer provides the additional property values associated with the attributes, the attributes with additional property values can be verified at block 616.

At block 620, the configuration service 114 may configure the infrastructure. In some embodiments, the configuration service 114 may search one or more infrastructure configuration templates. In some embodiments, the datastore 116 may include a plurality of infrastructure configuration templates. In one embodiment, the datastore 116 may store the plurality of infrastructure templates by associating the each template with a customer's (e.g., a user of the template) profile. In some embodiments, the configuration service 114 may search one or more templates from the plurality of infrastructure templates based on the customer's profile. For example, the configuration service 114 may search the templates that are used by other customers in the group identified at (5) (shown in FIG. 5A). In some embodiments, the configuration service 114 may provide the templates by prioritizing the templates. For example, the configuration service 114 may prioritizes the templates based on the similarities of the user's profile with the customer's profile. Further in this example, if the customer is operating a restaurant, the templates that are previously used by another customer who is in the same group and operating the same type of restaurant with the customer can be provided with a higher prioritization than other templates.

Further at block 620, in some embodiments, the configuration service 114 configures the infrastructure using the identified services and actions associated with the services. The identified services can be implemented in various infrastructure configurations. For example, a service, such as EC2, can be configured in various configurations based on the customer's specific input or needs. These configurations can be referred to as infrastructure configuration, and the infrastructure configuration may define network policies, flows, controls, or managing cloud computing infrastructure resources. In some embodiments, the configuration service 114 utilizes the verified attributes to perform the infrastructure configuration. In these embodiments, the configuration service 114 may also utilize a variety of data related to the customer to perform the infrastructure configuration. For example, the data can include the customer's profile, network service usage (i.e., previously configured infrastructure configuration), the customer's privacy level, etc. In some embodiments, the configuration service 114 may recommend one or more infrastructure configuration templates. In these embodiments, the configuration service 114 may search the datastore 116 to find a template that can be used for the infrastructure configuration. For example, the configuration service 114 may apply criteria to determine whether the template can be used, such that the configuration service 114 may use the template that has a same or similar customer profile, privacy level, network usage, etc. For example, assume a network service customer has a profile that characterizes the intended use of the network service or otherwise a characterization of the type of organization or operation that will utilize the network service. In this embodiment, a template created by another customer that can be matched to the current customer (such as via profile matching) can be recommended to the customer. Illustratively, the degree of matching or correlation of types of organizations, types of uses, etc. can vary greatly depending on the availability of templates, variation in types or configurations of network services, and the like. These are provided as examples, and various criteria can be used to determine whether the customer can use a template.

At block 622, the network infrastructure based on the identified services and templates can be deployed. In some embodiments, the configuration service 114 may detect an error and provides it to the customer. In these embodiments, the configuration service 114 can provide instruction to the customer to resolve the error. For example, if an error is caused by a parameter value associated with an attribute, the configuration service 114 may provide a proper parameter value range that can be used for the attribute. The network infrastructure configuration routine 600 can be ended at block 624.

At block 464, the configuration service 114 may update the existing infrastructure configuration. At block 466, the configuration service 114 may deploys the updated infrastructure configuration. The network infrastructure configuration update routine 450 can be ended at block 468.

FIGS. 7A-7E illustrates an example of configuring a network infrastructure by utilizing the configuration service 114 according to one or more embodiments disclosed herein.

Figure 7A:
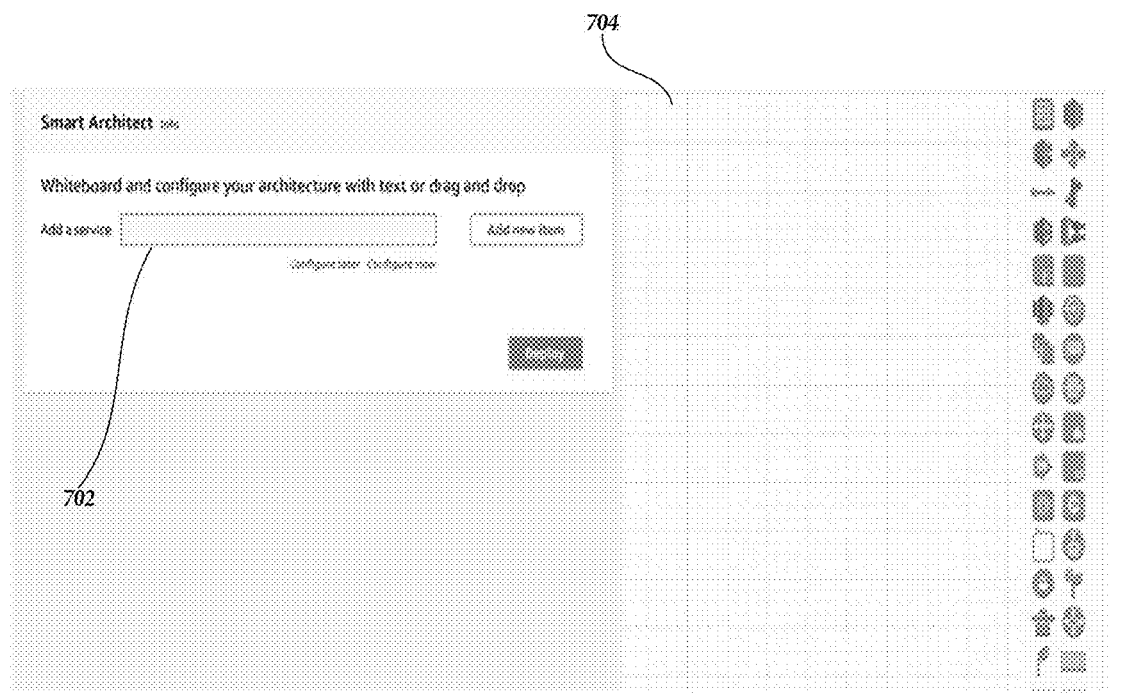
FIGS. 7A-7E illustrates an example of configuring a network infrastructure by utilizing the configuration service.

FIG. 7A illustrates an example of GUI that can be displayed on the customer computing device 102. The GUI can include a search window 702 and a whiteboard 704.

Figure 7B:
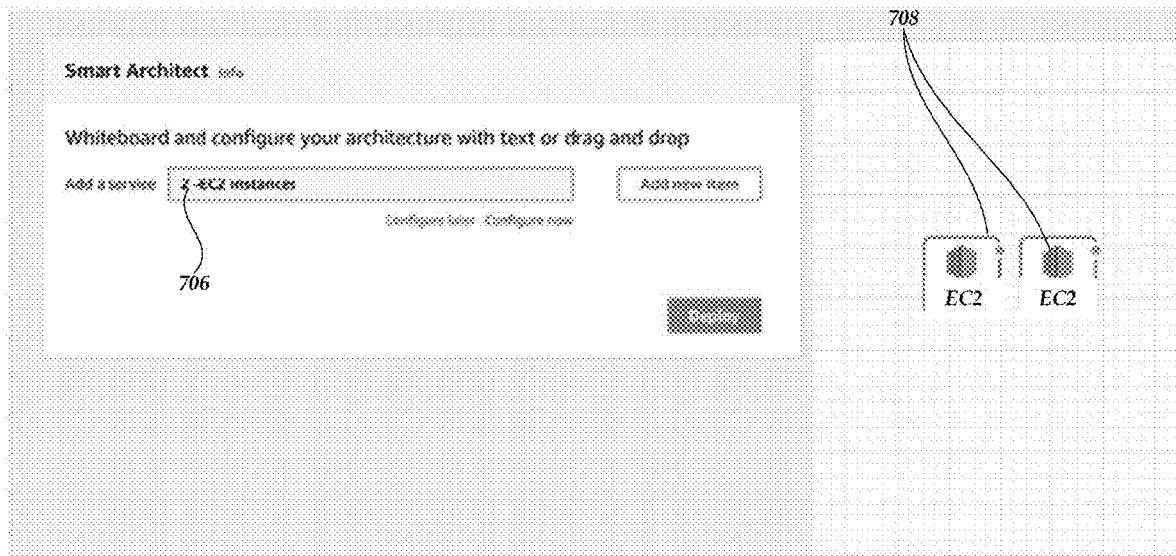

FIG. 7B illustrates a customer input using the search window 702. As shown in FIG. 7B, a customer may add a service by typing the service name 706 in the search window 702. The added services can be displayed on the whiteboard 704, such as shown in 708.

Figure 7C:
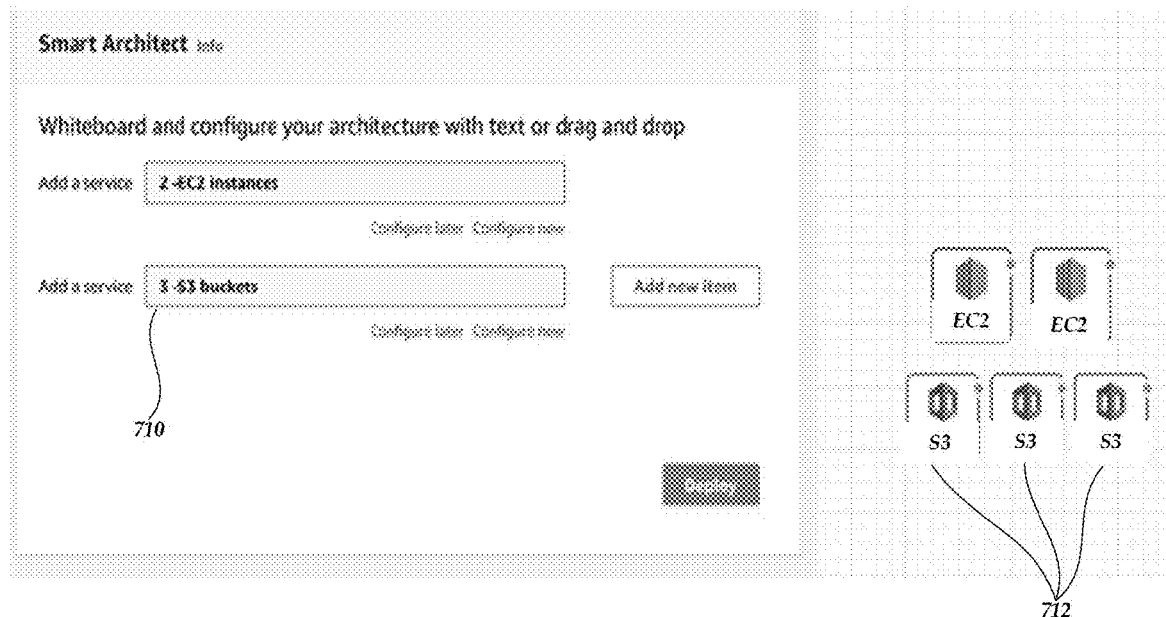

FIG. 7C illustrates an additional customer input using the search window 702. As shown in FIG. 7C, a customer may add additional service by typing the service name 710 in the search window 702. The added additional services can be displayed on the whiteboard 704, such as shown in 712.

Figure 7D:
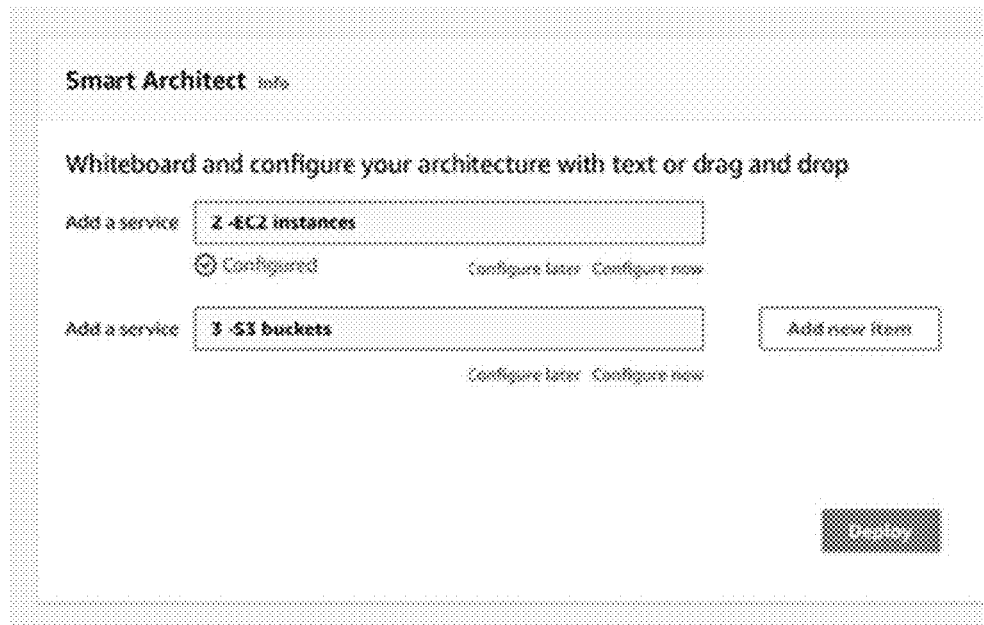

FIG. 7D illustrates an infrastructure configuration setting by selecting various types cloud infrastructure.

Figure 7E:
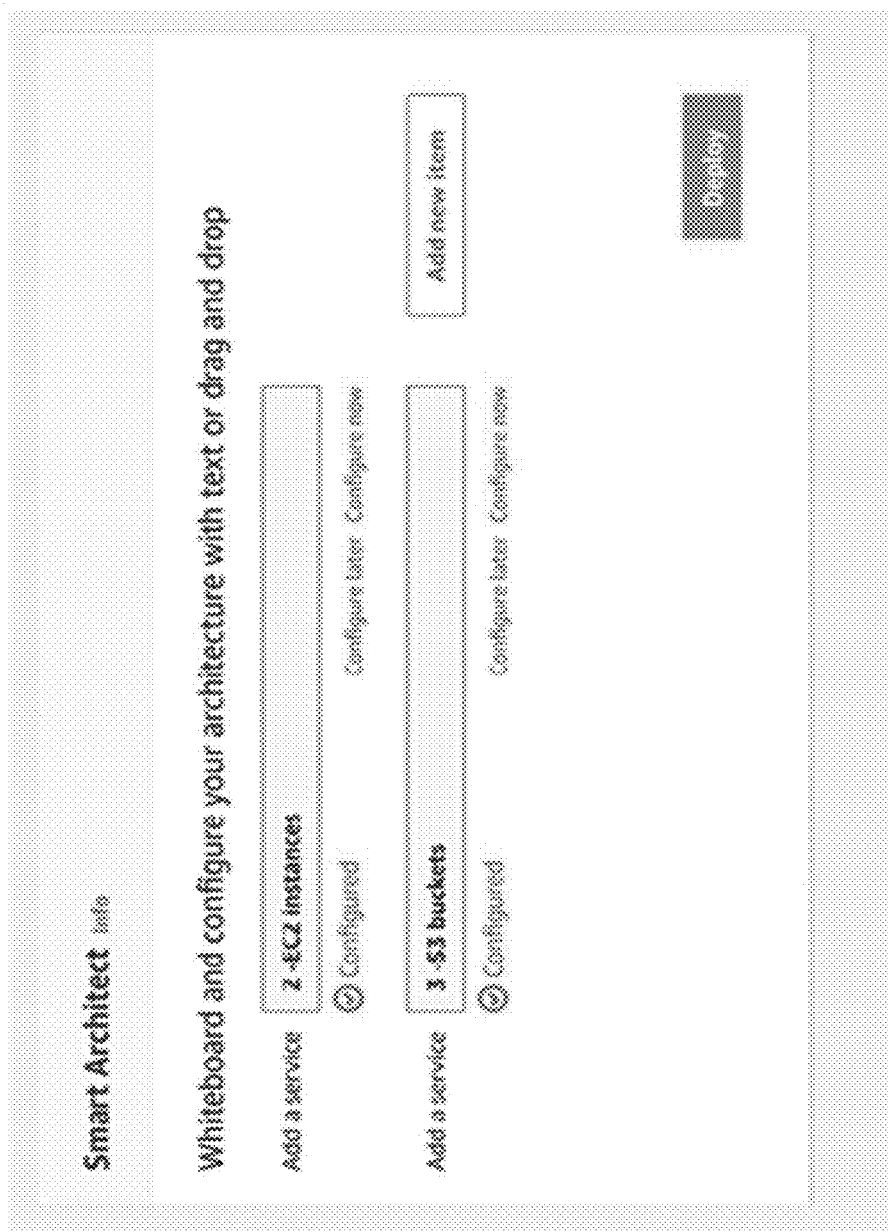

FIG. 7E illustrates infrastructure configuration results.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of customer computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable customer computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without customer input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed:

1. A system for providing a network infrastructure configuration for network-based services, the system comprising:
   one or more computing processors and memories for executing computer-executable instructions to implement a configuration service, wherein the configuration service is configured to:
      obtain, from a customer computing device, a customer input provided by a customer, wherein the customer input corresponds to a configuration of one or more network-based services from a plurality of network-based services;
      in response to receiving the customer input from the customer computing device, identify a customer's profile;
      identify other customers having a similar profile with the customer's profile;
      group the customer with the identified other customers;
      identify at least one network-based service from the plurality of network-based services, wherein the identification is based on processing results of the customer input and searching network-based services used by the identified other customers;
      identify attributes of each of the identified at least one network-based service;
      verify, by accessing to a datastore, the identified attributes of each of the identified at least one network-based service and a value associated with each of the identified attribute;
      in response to failure of the verification, transmit a request for additional attributes to the customer computing device, wherein the request includes a guide for the additional attributes;
      obtain, from the customer computing device, the additional attributes;
      select a configuration template from a plurality of configuration templates, wherein the selection of the configuration template is comprising:
         identify the configuration template by searching configuration templates by accessing profile information of individual customer of the group of the customers, wherein the configuration template is previously deployed to at least one of the group of customers; and
         in response to identifying the configuration template from the searching, transmit the identified configuration template to the customer computing device; and
      receive, from the customer computing device, an input for configuring the configuration template; and
      configure the network infrastructure based on the configuration template.

2. The system as recited in claim 1, wherein the customer's profile includes network usage history of the customer.

3. The system as recited in claim 1, wherein the configuration service is configured to process the customer input based on natural language processing.

4. The system as recited in claim 3, wherein the customer input includes the customer's profile.

5. The system as recited in claim 1, wherein the customer input is in a form of a predefined rule, wherein the predefined rule includes identification of the one or more network-based services and information related to use of the one or more network-based services.

6. The system as recited in claim 1, wherein the configuration service provides a recommendation of selecting network-based services based on the customer input, wherein the customer input includes the customer profile.

7. The system as recited in claim 1, wherein the configuration service is further configured to update the network infrastructure by:
receiving, from the customer computing device, a customer input related to the update;
processing the customer input related to the update, wherein the processing includes identification of network-based services related to the update;
identifying attributes and values related to the identified network-based services related to the update;
verifying the identified attributes and values;
in response to verifying the identified attributes and values, updating the configured network infrastructure, wherein the update is a selection of configuration template from the plurality of configuration templates, and wherein the selection is based on the one or more attributes of the customer, wherein the attributes of the customer are based on a customer's profile, network usage pattern, and level of privacy;
providing the updated network infrastructure to the customer computing device;
receiving, from the customer computing device, an approval of a deployment of the updated network infrastructure; and
in response to receiving the approval from the customer computing device, cause deployment of the updated network infrastructure.

8. A system for providing a network infrastructure configuration for network-based services, the system comprising:
one or more computing processors and memories for executing computer-executable instructions to implement a configuration service, wherein the configuration service is configured to:
obtain, from a customer computing device, a customer input provided by a customer, wherein the customer input corresponds to a configuration of one or more network-based services from a plurality of network-based services;
in response to receiving the customer input from the customer computing device, identify a customer's profile;
identify other customers having a similar profile with the customer's profile;
group the customer with the identified other customers;
identify one or more network-based services based at least one additional profile in the group; and
identify, based on the identified one or more network-based services, a configuration template from a plurality of configuration templates, wherein identifying the configuration template includes:
identifying, from a plurality of configuration templates, the configuration template, wherein the configuration template is previously deployed to at least one of the group of customers; and
in response to identifying the configuration template from the searching, transmitting the configuration template to the customer computing device; and
receive, from the customer computing device, an input for configuring the configuration template; and
configure the network infrastructure based on the configuration template.

9. The system as recited in claim 8, wherein the customer's profile includes network usage history of the customer.

10. The system as recited in claim 8, wherein the identification of the at least one network-based service is based at least on processing results of the customer input and searching network-based services used by the identified other customers.

11. The system as recited in claim 10, wherein the processing result relates to a verification of the attributes and value associated with each attribute, wherein one or more attributes previously used by the customer are stored in a datastore.

12. The system as recited in claim 8, wherein the configuration service is configured to process the customer input based on natural language processing.

13. The system as recited in claim 12, wherein the customer input includes the customer's profile.

14. The system as recited in claim 8, wherein the configuration template is prioritized based on a similarity between the customer's profile and profiles of the other customers in the group.

15. The system as recited in claim 8, wherein the configuration service is further configured to update the configured network infrastructure by:
receiving, from the customer computing device, a customer input related to the update;
processing the customer input related to the update, wherein the processing includes identification of network-based services related to the update;
identifying attributes and values related to the identified network-based services related to the update;
verifying the identified attributes and values;
in response to verifying the identified attributes and values, update the configured network infrastructure, wherein the update is a selection of configuration template from a plurality of configuration templates, and wherein the selection is based on one or more attributes of the customer, wherein the attributes of the customer are based on a customer's profile, network usage pattern, and level of privacy;
provide the updated network infrastructure to the customer computing device;
receive, from the customer computing device, an approval of a deployment of the updated network infrastructure; and
in response to receiving the approval from the customer computing device, cause deployment of the updated network infrastructure.

16. A computer-implemented method for providing a network infrastructure configuration for network-based services, the method comprising:
obtaining, from a customer computing device, a customer input;
in response to obtaining the customer input from the customer computing device, process the customer input to identify a customer profile;
identifying other customers having a similar profile with the customer profile;
grouping the customer with the identified other customers;
identifying at least one network-based service;
identifying attributes for each identified service;
generating a processing result corresponding to the identified attributes and property values associated with the attributes;

verifying the processing result;

providing a list of network infrastructure templates;

receiving, from the customer computing device, a selection of a network infrastructure template from the list of network infrastructure templates; and configuring the network infrastructure based on the selected network infrastructure template.

17. The computer-implemented method of claim 16, wherein the customer input is at least related to use of the network-based services, and wherein the customer input is in a form of a predefined rule, wherein the predefined rule includes at least one network-based services and information related to use of the network-based services.

18. The computer-implemented method of claim 16, wherein the identification of the network-based service is based at least on processing results of the customer input and searching network-based services used by the identified other customers.

19. The computer-implemented method of claim 16, wherein the processing result relates to a verification of the attributes and value associated with each attribute, wherein one or more attributes previously used by the customer are stored in a datastore.

20. The computer-implemented method of claim 16, wherein the selection is based on one or more attributes of the customer, wherein the attributes of the customer include a customer's profile, network usage pattern, and level of privacy.

21. The computer-implemented method of claim 16, wherein the list of network infrastructures is a result of searching network infrastructure templates used by the other customers in the group.

22. The computer-implemented method of claim 16, wherein the list of network infrastructures is prioritized based on a similarity between the customer's profile and profiles of the other customers in the group.

* * * * *